US011881373B2

(12) United States Patent
Koschmieder

(10) Patent No.: US 11,881,373 B2
(45) Date of Patent: Jan. 23, 2024

(54) TRIODE WITH WIREBONDED STRUCTURE AND METHOD OF MAKING

(71) Applicant: Thomas Koschmieder, West Bloomfield, MI (US)

(72) Inventor: Thomas Koschmieder, West Bloomfield, MI (US)

( * ) Notice: Subject to any disclaimer, the term of this patent is extended or adjusted under 35 U.S.C. 154(b) by 187 days.

(21) Appl. No.: 17/573,566

(22) Filed: Jan. 11, 2022

(65) Prior Publication Data

US 2023/0223229 A1 Jul. 13, 2023

(51) Int. Cl.
*H01J 1/46* (2006.01)
*H01J 1/88* (2006.01)

(52) U.S. Cl.
CPC . *H01J 1/46* (2013.01); *H01J 1/88* (2013.01)

(58) Field of Classification Search
CPC ..................................... H01J 1/46; H01J 1/88
See application file for complete search history.

(56) References Cited

U.S. PATENT DOCUMENTS

| | | | | |
|---|---|---|---|---|
| 4,100,455 | A | 7/1978 | DuBois | |
| 5,459,374 | A | 10/1995 | Thoeny | |
| 5,463,250 | A | 10/1995 | Nguyen | |
| 5,548,185 | A | 8/1996 | Kumar | |
| 6,452,329 | B1 | 9/2002 | Jang | |
| 6,737,798 | B2 | 5/2004 | Ha | |
| 6,943,487 | B1 | 9/2005 | Ryu | |
| 8,053,896 | B2 | 11/2011 | Yasuoka | |
| 9,583,300 | B2 | 2/2017 | Tatsuda | |
| 2006/0205313 | A1 * | 9/2006 | Fink | H01J 9/148<br>445/24 |

OTHER PUBLICATIONS

Rao R. Tummala, Eugene J. Rymaszewski, Alan G. Klopfenstein, Microelectronics Packaging Handbook, Part II, 1997, pp. II-186-II-217, Chapman & Hall, NY, NY.

* cited by examiner

*Primary Examiner* — Anne M Hines

(57) ABSTRACT

A wire bonded triode for amplification of electromagnetic signals that includes an electron emitter (cathode), control grid, and an electron collector (anode) and having one or more wire bonded structures. A method of making a triode for amplification of electromagnetic signals that includes wirebonding one or more wires to form a wire bonded structure corresponding with one or more of an anode, grid and/or cathode element.

14 Claims, 22 Drawing Sheets

TRIODE WITH WIREBONDED STRUCTURE AND METHOD OF MAKING

CROSS-REFERENCE TO RELATED APPLICATIONS

The present application claims benefit of priority to U.S. provisional patent application No. 63/194,128 having a filing date of 27 May 2021 which is incorporated herein by reference in its entirety.

BACKGROUND

Field of the Invention

The present disclosure relates to triodes. Triodes such as those for the amplification of electromagnetic signals comprise an electron emitter (cathode), a control grid, and an electron collector (anode). In the present disclosure at least one of the electron emitter (cathode), the control grid, and the electron collector (anode) comprises a wirebond and/or a wirebonded structure. The present disclosure further relates to methods for making the triodes of the present disclosure and devices containing the triodes such as those having one or more wirebonded structures.

Description of the Related Art

Triodes, e.g., for amplification, comprise in simplest terms an electron emitter (cathode), a control grid, and an electron collector (anode) all disposed in a vacuum cavity. Connectivity points (e.g. terminal leads) allow the cathode, grid and anode to be electronically controlled and used in electrical circuits. The triode allows for the amplification of low strength electromagnetic signals, e.g., radio signals, so that an analog or digital output can be created from received electromagnetic signals for additional uses, e.g., audio and other signal amplification.

Triodes are typically classified as a style of electronic packaging known as vacuum tubes. Vacuum tubes typically include a cavity or enclosed space defined by walls that are impermeable, e.g., do not permit ingress or egress of materials, notably gases, and in which one or more of the triode elements are housed. Often a getter is present inside the cavity to scavenge adventitious materials and maintain a vacuum environment within the vacuum tube. In a glass tube type triode (vacuum tube) one end is sealed by closing the glass and the other end is sealed within a fixture including terminals. The fixture may be of a style to fit distinct sockets. A wide variety of industry standard sockets are in use. A vacuum tube terminal pattern typically fits into only a single unique socket style.

The three elements for the triode, i.e., cathode, grid and anode, are disposed in the vacuum tube (in the vacuum cavity) so as to achieve electrical connectivity to provide the needed electrical circuit. The cathode functions as an electron emitter. The grid functions to control whether the emitted electrons can travel to the electron collector (anode). Amplification derives from the quantity of electrons that pass through or by the grid. As voltage changes at the grid, more or fewer electrons are permitted to pass to the collector. With no signal or a reverse voltage, the grid blocks essentially all electrons from making the path from the emitter to the collector.

An example of the use of a triode for amplification relates to a radio signal. The radio signal (e.g., an electromagnetic wave) provides a voltage signal to the grid. As the radio signal amplitude changes so does the voltage signal at the grid. A high radio signal amplitude (i.e., a loud signal) corresponds with a high voltage at the grid allowing more electrons to pass through to the collector. A low radio signal amplitude reduces and/or completely stops electrons from flowing between the emitter and collector.

Two common types of emitter are conventionally used: thermionic and field-effect. Thermionic emitters use heat to expel electrons from a source, usually a metal. The heat is created by applying an electrical current to the emitter metal. Electron emission can be controlled by adjusting the electrical current, selecting particular emitter metals, and/or coating the metal with a material which more readily emits electrons.

A thermionic emitter is always on when the vacuum tube or associated circuit is electrified or powered up. This keeps the emitter in a thermally stable state permitting a stable and consistent source of electrons (current).

A field-effect emitter (also called a cold cathode) uses an external electric field to pull electrons from the emitter surface. In order to cause electrons to emit from the cathode, the electric field strength needs to be sufficiently high thus favoring close spacing between the source of the electric field and the emitter. As with a thermionic emitter, the choice of emitting metal, metal shape and/or coating on the emitting metal play a role in the emitted current strength.

Modern technology has increased the options for emitters which today include nanotubes and point shapes. In particular for field-effect emitter systems, these surface and shape types reduce the electric field strength needed to pull electrons from the emitter.

The grid plays an important role in amplification. The grid input signal strength controls whether the emitted electrons have sufficient energy to travel from the emitter to the collector. Note that the grid input signal can be modified to better achieve a variety of goals including amplification.

The electron collector, i.e., anode, receives the electron current (emitted current/emitted electron flow). The collector current is the amplification of the input signal (e.g., at the grid). The collector current can be used for any variety of electronic purposes including the creation of audio signals (e.g., radio reception converted to sound) as part of a larger electrical circuit or device.

The electron collector is commonly a metal (conductor). Electrons enter the collector and thus effect an electrical circuit change. Collectors can be in the form of a plate. As the name suggests, the collector can be shaped as a flat surface to gather the electrons. Other shapes for the collector are possible.

The electron collector can be coated with a fluorescing material which functions to emit light when impacted by electrons. Though now uncommon, vacuum fluorescent displays, VFD, are such devices. VFD's were commonly used as displays for automobile functions, electronic equipment functions (e.g. VCR controls), and similar electronic operations for which a display was needed. Cathode ray tubes (CRT), i.e. television tubes, can be considered as VFD's.

VFD's are packaged differently from vacuum tube triodes and may use rectangular and/or conical cavities to house the emitter (cathode), grid and coated collector (anode). These packages are evacuated and then sealed under vacuum. The seal is a lid or cover that is usually glass which allows the light created during electron bombardment of the fluorescing collector to be seen. This creates a display that can be used to provide visual information.

Vacuum sealing a vacuum tube or VFD is a complex challenge and is also an important factor in the production of MEMS (microelectromechanical systems) sensors like gyroscopes and accelerometers. The state of art for the lid and the seal between the lid and the package has continued to evolve since VFDs were first created.

For both the vacuum tube and the VFD, a getter is preferably used to maintain a vacuum inside the package. The vacuum inside vacuum tubes and VFDs tends to degrade over time from outgassing of atoms and molecules from the package and from the triode. Triodes using thermionic emission are particularly prone to vacuum degradation over time, e.g., due to the heat to emit electrons.

A getter material is used to delay vacuum degradation. Degraded vacuum causes increasing numbers of emitted electrons to collide with contaminating atoms and molecules and thus not participate in the electron flow from the emitter to the collector. The getter material addresses this problem by chemically binding and/or adsorbing the contaminating atoms and molecules. Once bound the contaminating atoms and molecules are no longer freely mobile in the vacuum. Reducing the contaminating atoms and molecules present in the device increases the total operational life for both vacuum tubes and VFDs.

VFDs were conventionally not considered to be amplification triodes. This changed with Korg's introduction of the Noritake-produced NuTube product. The NuTube product is a VFD construction including a fluorescing coating on the electron collector. It is a triode amplifier by design. For Korg, a company making musical equipment, the NuTube creates the opportunity for vacuum tube like amplified sound output for speakers, etc. Unlike semiconductor amplifier products, vacuum tubes (and now VFDs) have harmonics of the principal sound frequencies. This adds a "richness" to the sound that is perceptible to the human ear.

U.S. Pat. No. 6,452,329 shows an array of filaments (50). The electrons emitted from the filaments are pulled through the grid (40) to impact the fluorescing anode material (44). The filaments are welded to support structures.

U.S. Pat. No. 6,943,487 shows an array of filaments (24) and a tensioning mechanism (20). Each filament has a tensioner at both filament ends. The tensioners keep the filament from sagging at high temperature.

U.S. Pat. No. 4,100,455 shows an electrostatic lens (38) above the filament (28). There is no grid in the shown VFD. Instead the electric field from the electrostatic lens spreads out the electron stream to more uniformly impact the fluorescing anode surface (14c).

U.S. Pat. No. 5,548,185 shows a multi-layer array of filaments (101, 102).

U.S. Pat. No. 9,583,300 shows the Noritake NuTube design. The filament is (110) with the grids identified as (130-1/-2) and fluorescing surfaces and anode identified as (120-1/-2).

U.S. Pat. No. 9,583,300 shows a tensioning system for the filament (115).

U.S. Pat. No. 9,583,300 shows the grid as a metal film with openings for passing electrons (130).

In the above related art, the filaments are not created by a wirebond process nor do the filaments have a three dimensional wire bonded structure beyond being stacked.

U.S. Pat. No. 5,459,374 shows wirebonds (36) that are used for electrical connectivity between a semiconductor device (30) and the fluorescing element (14). The wirebonds used here are for electrical connectivity between the semiconductor chip and the other elements needed for a display.

U.S. Pat. No. 5,463,250 shows wirebonds (40) used for electrical connectivity. The wirebonds do not form the anode, grid or cathode.

U.S. Pat. No. 6,737,798 shows wirebonds (36') being used to provide voltage connectivity to the grid and anode. The wirebonds provide the path for the radio signal to reach the grid. The wirebonds do not form the anode, grid nor cathode.

U.S. Pat. No. 8,053,896 shows wirebonds (18) used to connect a semiconductor device (16) with the VFD circuitry. The wirebonds are intentionally encapsulated in an insulating material (25A).

Microelectronics Packaging Handbook, Part II, Tummala, Rao R., Eugene J. Rymaszewski and Alan G. Klopfenstein, Chapman & Hall, NY, NY, 1997, pp. II-186-II-217 provides a description of modern wirebonding technology.

SUMMARY OF INVENTION

One aspect of the present disclosure is a triode that includes a housing or package defining an inner cavity, a grid, an emitter and a collector disposed inside the cavity, such that the grid, the emitter and/or the collector is a wirebonded structure at least partially disposed inside the cavity.

In an embodiment the wirebonded structure of the triode includes one or more wires having one or more wirebonded connections.

In an embodiment the wirebonded connections of the wirebonded structure are disposed within the cavity of the triode.

In an embodiment the wirebonded structure includes one or more wirebonded connections defining a plane inside the cavity of the triode and at least two of the wirebonded connections are in electrical conduction.

In an embodiment the package has a cover portion and a base portion with each of the grid, the emitter and the collector in contact with the base portion inside the cavity.

In an embodiment the triode contains one or more getter materials.

In an embodiment the triode has a wirebonded collector structure having a plurality of wirebonded connections defining a plane that is disposed inside the cavity and is elevated from the base portion.

In an embodiment the wirebonded structure is formed from a single wire that is wirebonded to itself to form a wirebonded structure inside the triode.

In an embodiment the wirebonded structure is on the base portion of the triode and includes a plurality of wirebonded connections that are parallel and in direct contact with the interior surface of the base portion.

In an embodiment the grid is disposed between the emitter and the collector.

In an embodiment at least two of the grid, the emitter and the collector have a wirebonded structure.

In an embodiment the grid, the emitter and/or the collector having the wirebonded structure includes a first pad, a second pad and a plurality of wires, wherein each of the plurality of wires has a first end and a second end, wherein the first end of each wire is wire bonded to the first pad and the second end of each wire is wire bonded to the second pad.

In an embodiment at least one of the first pad and the second pad is disposed on the interior surface of the base portion and one or more of the wires projects from the base portion to bridge the first pad and the second pad without direct contact to the base portion.

In an embodiment the grid, the emitter and the collector are in direct contact with the base portion and each are connected to an electrical lead passing through the base portion to a pin or connector on the exterior surface of the base portion.

In an embodiment the emitter, the grid and the collector are physically separated from one another inside the cavity.

In an embodiment the grid and/or the collector includes a wirebonded structure with a tensioned wire.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
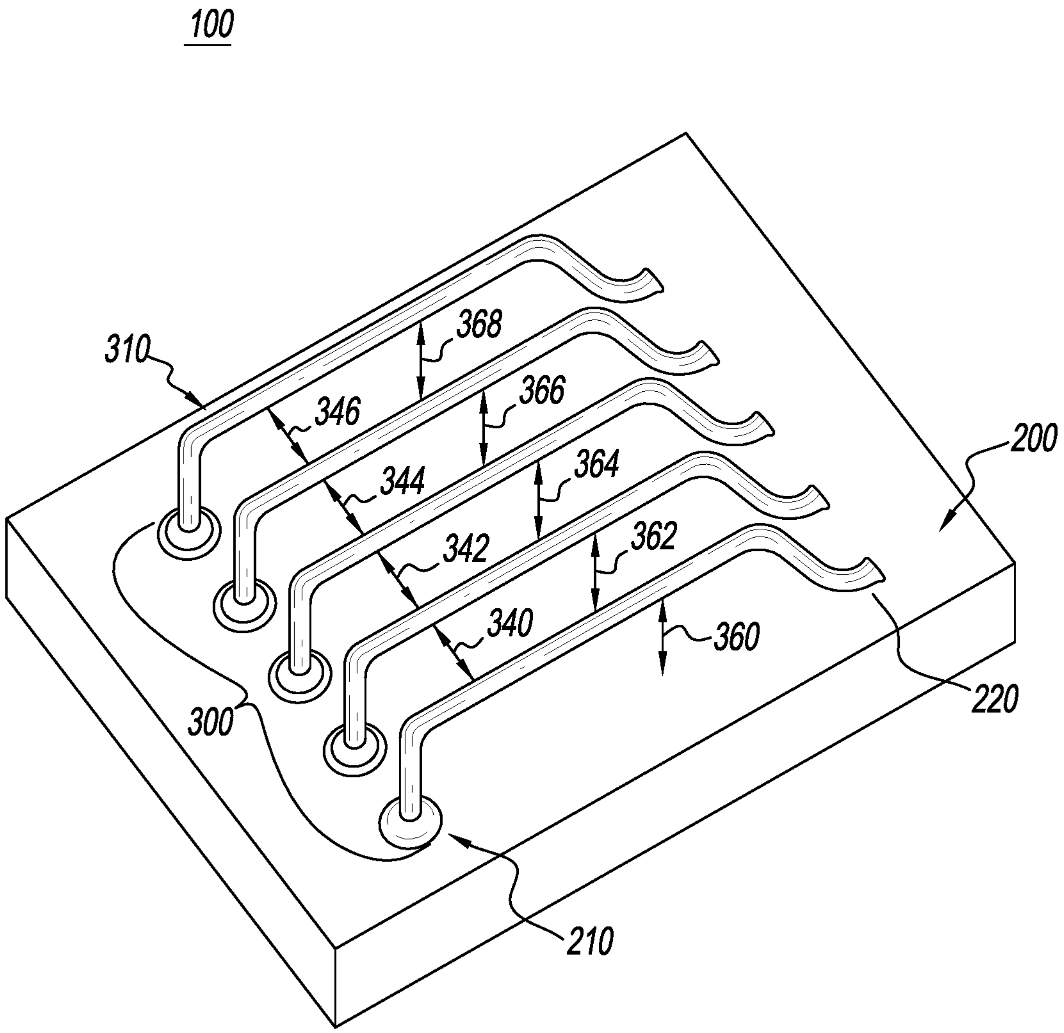
FIG. 1 shows a set of 5 wirebonds creating a set of parallel conductors above a substrate.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional", "optionally" or "preferably" means that the described step or event can or cannot occur or the subsequently described component(s) may or may not be present.

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the drilling fluid composition. The term "consisting of" describes aspects of the invention in which only those features explicitly recited in the claims are included and thus other components not explicitly or inherently included in the claim are excluded.

The present disclosure describes using wirebonding technology to form triode elements such as the grid, emitter and/or collector for vacuum tube devices, VFD devices and other solid state amplification devices. Triode devices that have one or more wirebonded structures are described. In the context of the present disclosure a wirebonded structure is formed during a wirebond process and has the shapes and purpose necessary for a triode element such as a triode anode, a triode cathode or a triode grid. In the context of the present disclosure a wirebond connection represents at least one mechanical and electrical connection formed by a wirebond process (e.g., a ball bond, a wedge bond, stitch bond, bond on ball) that is connected, preferably in direct connection, with a wire or filament wire, at least at one point preferably a plurality of points.

Conventionally, fixed elements (e.g., triode anode, triode cathode and/or triode grid) are created for each triode component using conventional joining techniques such as soldering, spot welding and mechanical methods. These elements are then joined as needed to provide the desired electrical connectivity. Wirebonding is not however used to form the isolated triode elements (e.g., fixed elements when present inside a VFD device). Conventionally, triode components in the form of fixed elements are formed before assembly and retain their original shape once inside a device.

In the present disclosure, the elements of a triode, e.g., grid, emitter and/or collector, can be formed by a wirebond process, e.g., by using wirebonding techniques, to form elements having one or more wirebonded connections, e.g., a wirebonded structure. The formation of the wirebonded structures/elements can be a part of the assembly process for making an isolated structure (e.g., an individual triode element) and/or during assembly of a VFD. Using multiple wirebonds and/or multiple wirebonded connections allows the creation of unique shapes for the triode elements thereby adding extra functionality to the triode elements individually or to a device containing the assembled elements. In addition, the wirebonded structures disclosed herein may serve the same electrical function as conventional assemblies. An example of an electrical function is the amplification of an electromagnetic signal (radio signal).

Examples of wirebonded structures and corresponding triode elements that are part of the present disclosure are shown in the figures. In FIG. 1, the grid (100) is preferably made by wirebonding filaments or wires to a substrate. Multiple wires or electrically conductive structures (310) may be created in a pattern (300). Each wirebond (310) preferably having at least two points, e.g., ends or electrical connectors, preferably wirebonded and/or mechanically attached and electrically connected to a substrate (200) at surface points (210 and 220). Surface points (210 and 220) may be on different substrate planes.

Figures 2A, 2B, 2C, 2D:
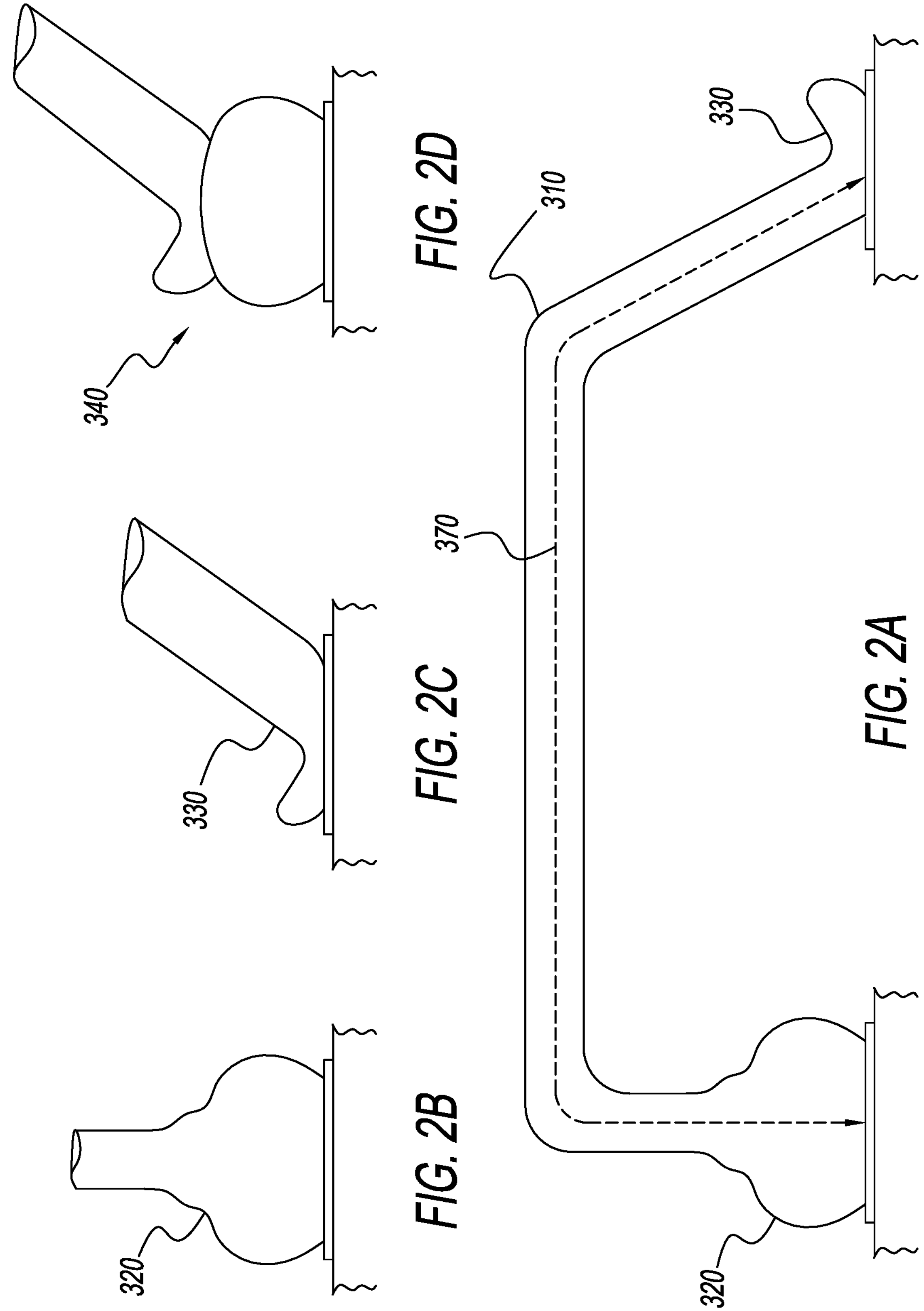
FIG. 2A-D show different portions of a wirebond with approximate shapes including a ball bond (FIG. 2B), wedge bond (FIG. 2C), wedge on a ball bond (FIG. 2D), wire bridge structure (FIG. 2A) representing the connection between different portions of a wire, different wires and/or other elements of a microelectronic device.

Typically ball bonds (320), FIG. 2B, and wedge bonds (330), FIG. 2C, may be used during the wirebond process to create the wirebonded connection between the grid wires and the substrate, FIG. 2A. A wedge bond on a ball bond is also possible (340), FIG. 2D. An example wire entirety includes the ball (320) and wedge bonds (330) and wire loop (370) running between the surface points is the wirebond (310), FIG. 2A.

The wirebonded structures shown in FIG. 1 are abbreviated for clarity. In the context of the present disclosure the wire that bridges contact points of a substrate will have at least one, and preferably a plurality, of wirebonded connections that form a three dimensional structure which functions as the triode element and is the wirebonded structure. In another aspect of the invention one or more triode elements is formed by wirebonding at least two wires to a substrate, preferably each wire separately bonded to the substrate at two points but optionally sharing one or more optionally co-terminus wirebonded connections to a substrate or other wirebond structure.

Examples of wirebonds include the wirebonds described in Microelectronics Packaging Handbook, pp. II-186-II-217. Typically the wire (wire filament) diameter may range from 5 to 100 micron, preferably 10-75 micron, 15-50 micron, 20-40 micron, or 25-30 micron. Ball bond diameters can range from 20-150 micron, preferably 30-125 micron, 40-100 micron, 50-90 micron, 60-80 micron or about 75 micron. Creation of the ball and wedge bonds from the wire during bonding causes the wire to be reshaped locally. The ball and wedge bonds (wirebonded connections) preferably scale with the wire diameter. For example, a ball or wedge bond preferably has a diameter that is 1-10 times the wire diameter, preferably 2-9 times the wire diameter, 3-8 times the wire diameter, 4-7 times the wire diameter or 5-6 times the wire diameter.

The horizontal plane spacing between wirebonds (340, 342, 344, and 346) is not required to be uniform at the points at which the wirebonds are connected to a substrate or other element (210 and 220) nor along the length of a wirebonded element (310), FIG. 1. Vertically the wirebonds (310) may have different heights (360, 362, 364, 366, and 368) to the substrate (200). The heights of wirebonds as a distance from a plane defined by the substrate or connection points on a substrate are not required to be uniform at the ball and wedge wirebonded connection (320, 330) nor along the filament wire, e.g., wire loop, that represents a portion of the wirebond (310) of a wirebonded structure (300).

A signal applied to the grid (100) changes the ability of electrons to pass through the horizontal (340, 342, 344, and 346) and vertical (360, 362, 364, 366, and 368) spacings from the emitter (not shown) to the collector (not shown). An example signal is an electromagnetic oscillation (radio signal) from recorded music.

Figure 3:
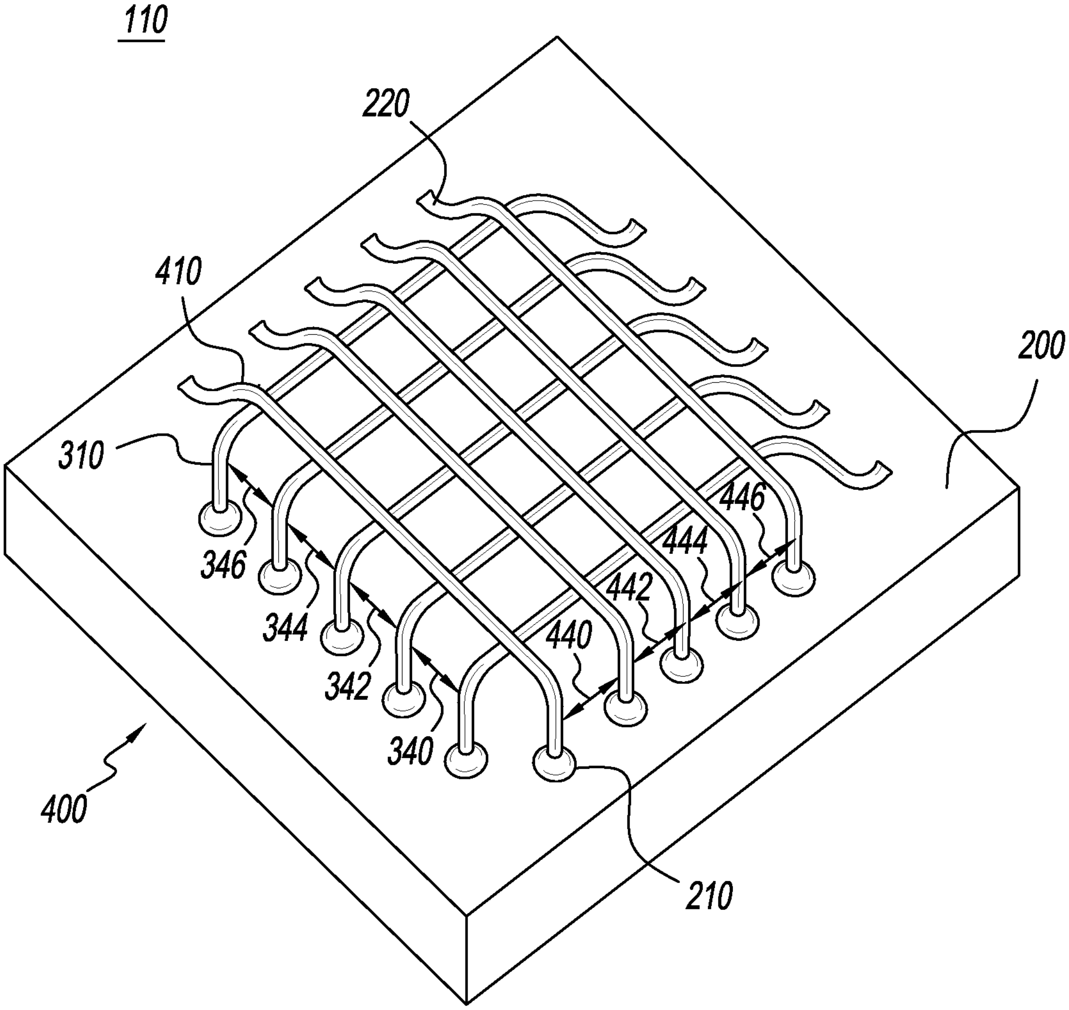
FIG. 3 shows wirebonds that overlap as planes to create a triode grid.

Multiple wirebonds are created in a pattern (400) that has groups 310 and 410 in a layered scheme grid (110), see FIG. 3. The horizontal spacing between wirebonds in group 310 (340, 342, 344, and 346) and in group 410 (440, 442, 444, and 446) is not required to be uniform. The vertical spacing between the wirebonds in group 310 and group 410 is not required to be uniform (not shown).

Figure 4A:
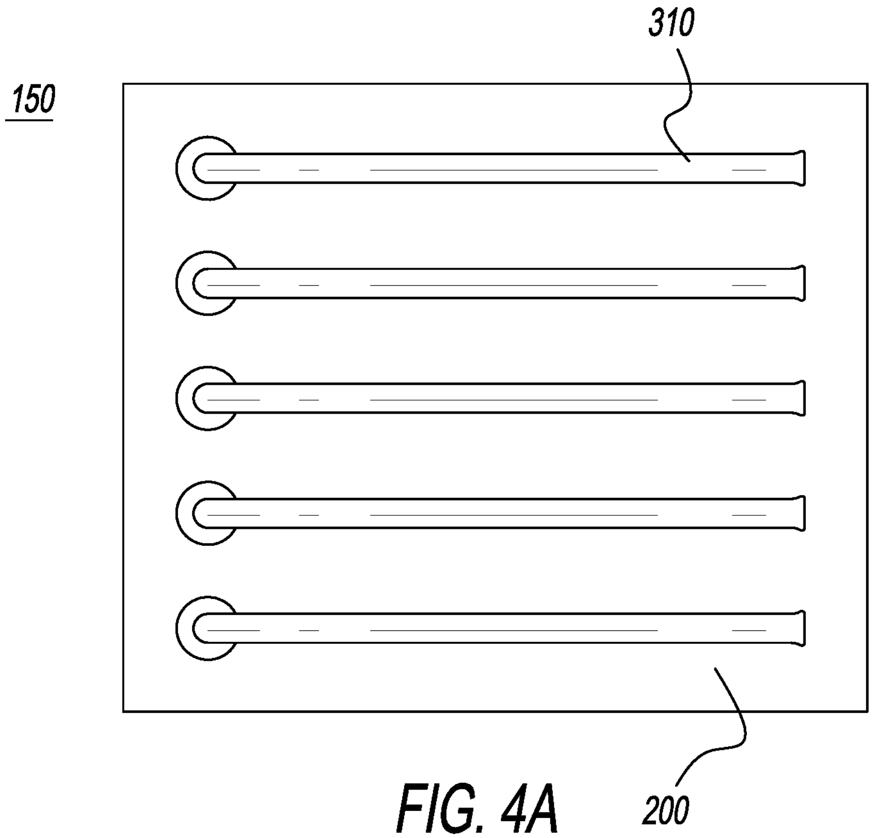
FIG. 4A shows a top down view of a wirebond grid made of a single layer of wirebonds oriented parallel to one another.
Figure 4B:
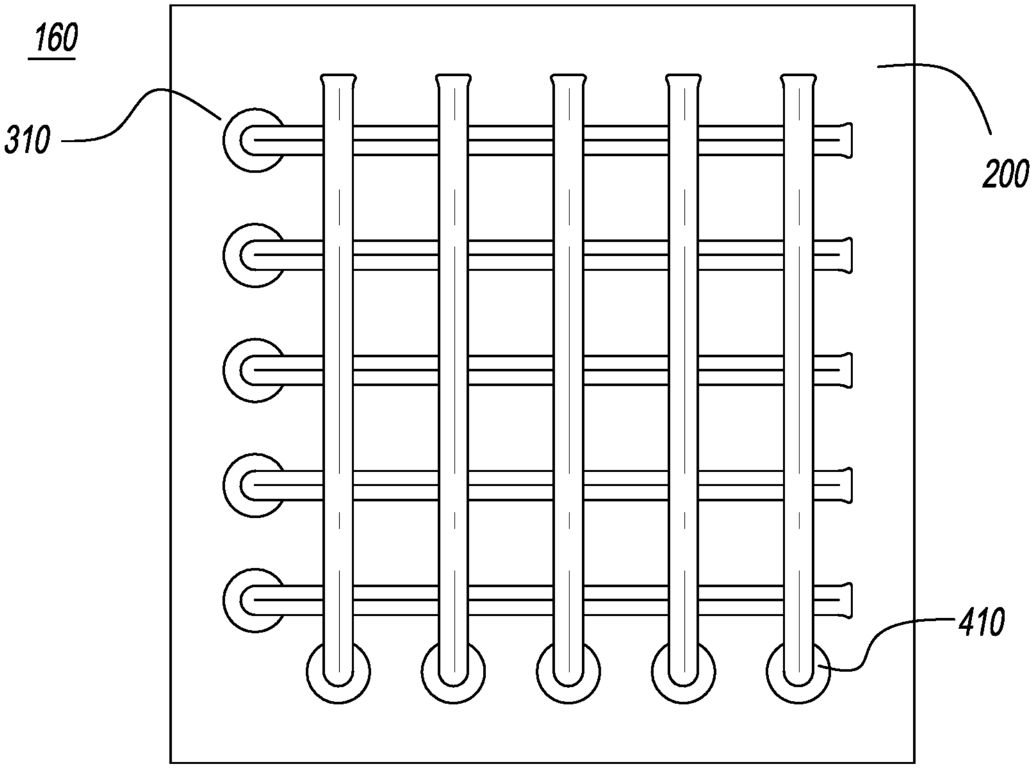
FIG. 4B shows a top down view of a wirebond grid made of two layers of oriented wirebonds crossing one another.

When looking down on to wirebond grids (310) and (410) the result may represent a slotted grid (150), FIG. 4A, and/or a cross-hatch grid (160), FIG. 4B, in which crosswires may optionally be electrically connected, e.g., may be connected by wirebonded connections at points where wires cross.

Figure 5A:
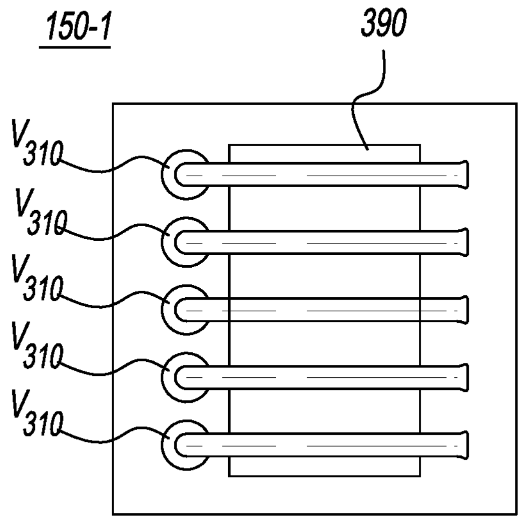
FIG. 5A shows individual wirebonds of a wirebond element having the same voltage.
Figure 5B:
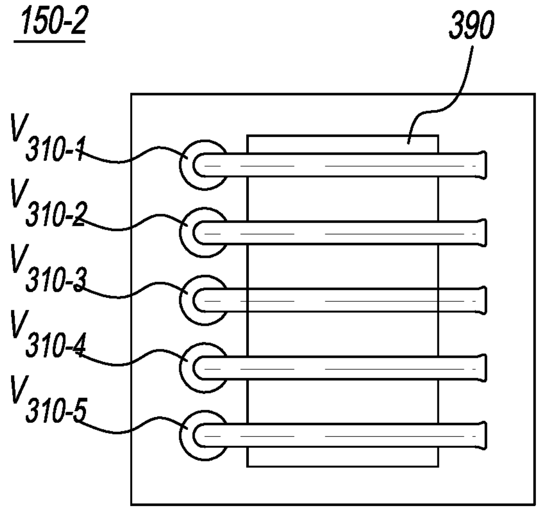
FIG. 5B shows individual wirebonds of a wirebond element having independent voltages.

In embodiments (100), FIGS. 5A-D, the voltage for each wirebond can be the same or different. In FIG. 5A the wirebond grid is shown to have the same voltage (V310) to each wirebonded element. FIG. 5B shows that each wirebonded element has its own independent voltage (V310-1-V310-5).

Figure 5C:
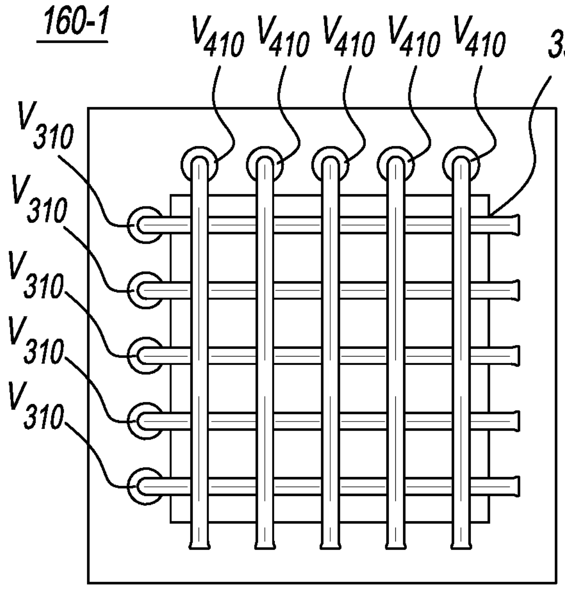
FIG. 5C shows individual wirebonds of a multi-layer wirebond element having the same voltage.
Figure 5D:
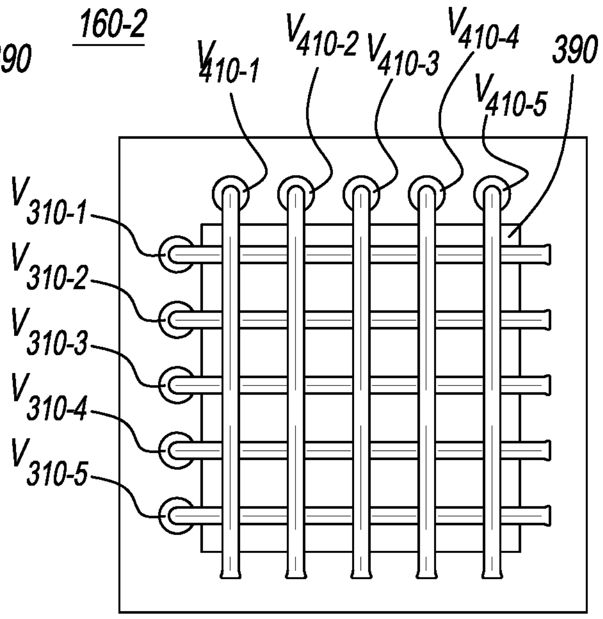
FIG. 5D shows individual wirebonds of a multi-layer wirebond element independent voltages.

In embodiments with two or more grid levels, each wirebond can be at the same or different voltage. FIG. 5C shows V310 and V410 for the two layers of wirebonds. These voltages may be the same. FIG. 5D shows the two layers of wirebonds with each a unique voltage (V310-1, -2, -3, -4, -5, V410-1, -2, -3, -4, -5).

In embodiments (150-1 (FIG. 5A), 150-2 (FIG. 5B)) and (160-1 (FIG. 5C), 160-2 (FIG. 5D)) an anode surface (390) exists at the substrate surface. The anode surface is typically created separately and is not part of the grid of wirebonds that forms the wirebonded structure of a triode.

Voltages chosen for the embodiments can be used to maximize electron collection at the anode (390). These voltages are not the same as the voltages used to pass electrons from the emitter (cathode) to the collector (anode). Example voltages include those described in, for example, U.S. Pat. No. 9,583,300 (see FIG. 13 description—U.S. Pat. No. 9,583,300 is incorporated herein by reference in its entirety) with 4 V at the anode and 3 V at the grid.

Figure 6A:
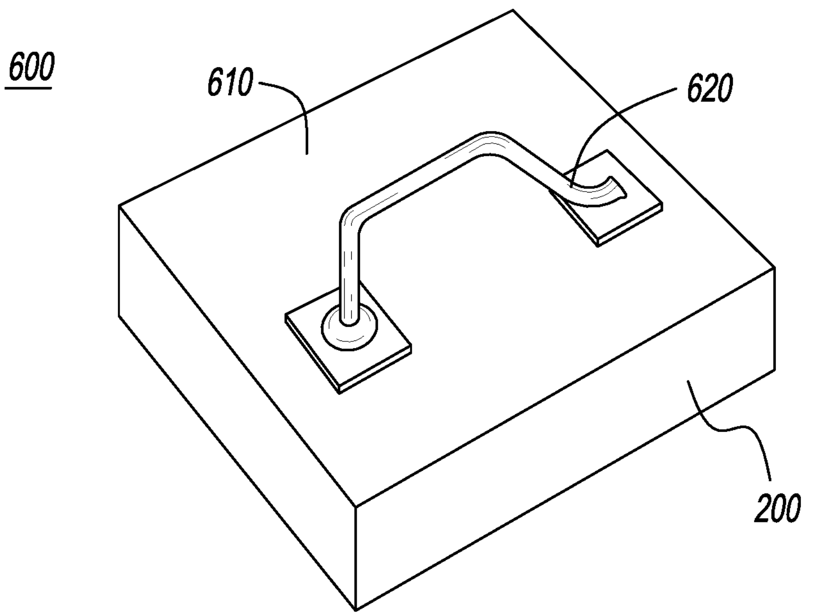
FIG. 6A shows a wirebond attached to a substrate.
Figure 6B:
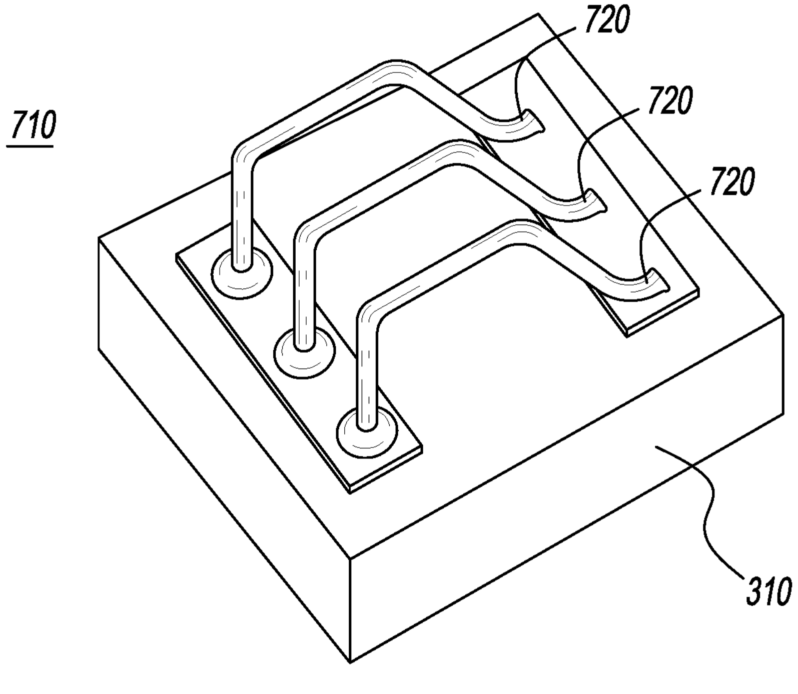
FIG. 6B shows a set of multiple wirebonds attached to a substrate.

In embodiments for the emitter (cathode) and collector (anode) a wirebonded structure having only a single wirebond (620), FIG. 6A, a wirebonded structure having multiple wirebonds (720), FIG. 6B, or a wirebonded structure having wire filaments or wire loops one or more of which has a wire-to-wire wirebonded connections (not shown) can be implemented. Most commonly emitters have a single wire filament that is wirebonded to the substrate (610) and/or has one or more wire-to-wire wirebonded connections.

The metal alloy used for the emitter wirebonds can be selected for improved electron emission. This metal alloy may have coatings to improve electron emission.

Collectors preferably have multiple wirebonds and/or wirebonded structures, FIG. 6B, thereby enhancing the ability of the collector to collect electrons. The embodiment strives for a large collecting metal surface area.

Techniques for tensioning of the emitter wire are known and include those described in, for example, U.S. Pat. No. 9,583,300 (see for example FIG. 8). Tensioning is intended to help maintain the alignment of emitter wires to the grid and anode, even while hot. Conventionally, tensioning is viewed as necessary in order to minimize the effects of shape distortion, e.g. wire sag, caused as current passes through a wire to generate heat for electron emission. Preferred shapes are springs that pull the, e.g., emitter wire, into alignment. Wirebonds can implement spring like tensioning by appropriate modification of their structure and composition and/or by tensioning the wire filament while wirebonded connections are formed during a wirebonding process.

Figure 7A:
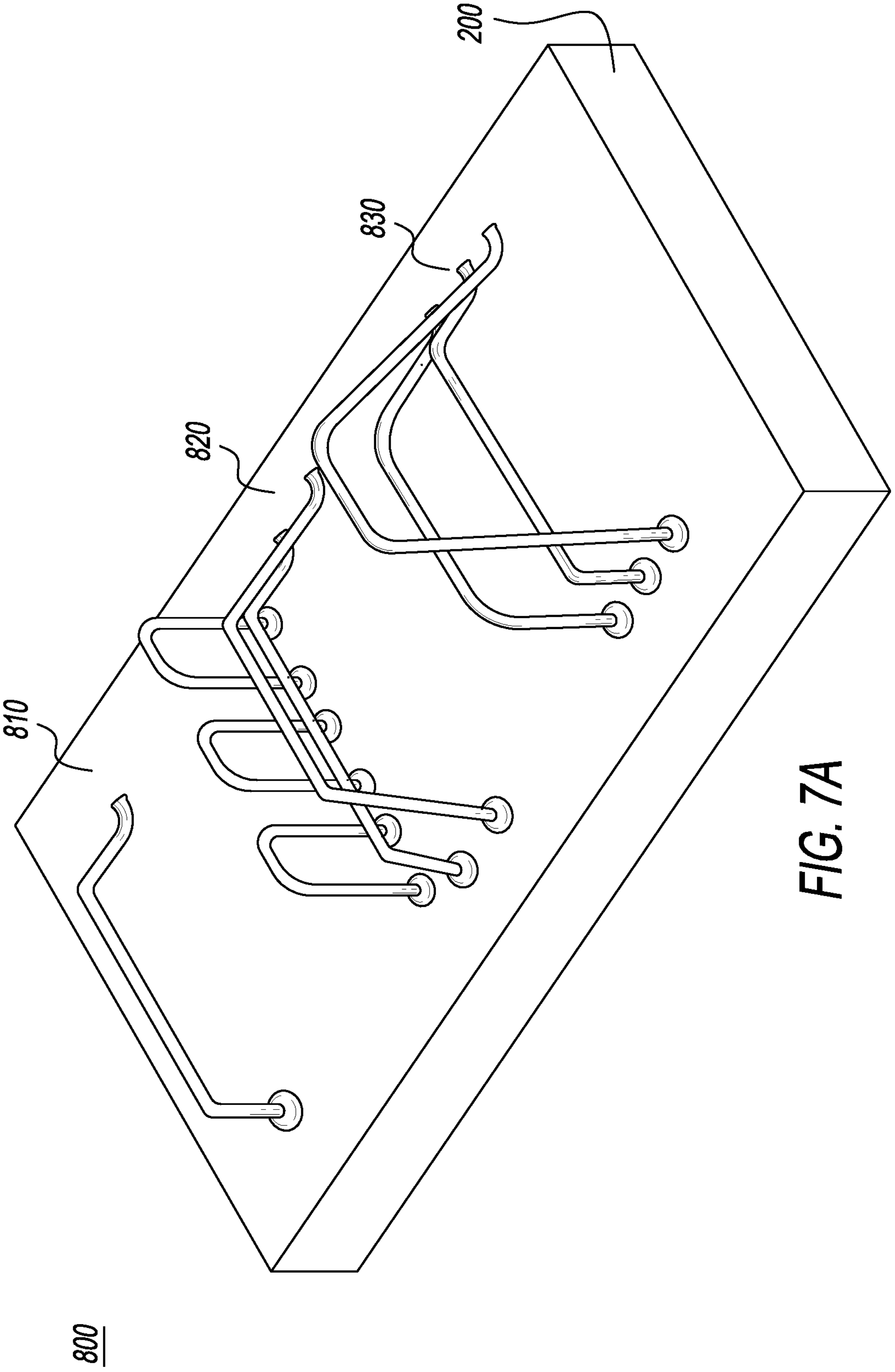
FIG. 7A shows a perspective view of an example of the entire triode formed with wirebonds with the electron flow oriented parallel to the substrate.

An example embodiment including emitter, grid and collector constructed of wirebonds is shown in FIG. 7A, (800). The emitter (810) is represented by a single wirebond. The grid (820) is a wirebonded structure that is represented by several wirebonds that provide a surface similar to a conventional grid. The collector (830) is a wirebonded structure including multiple wirebonds stacked vertically. The multiple wirebonds create a large electron collection surface area approaching a single plate surface area.

In the example embodiment (800) electrons are emitted at the emitter (810). If the grid voltage is set to pass electrons then the electrons pass through or by the grid (820) and are collected at the collector (830).

In the example embodiment (800) the substrate (200) surface is approximately parallel to the electron flow.

Figure 7B:
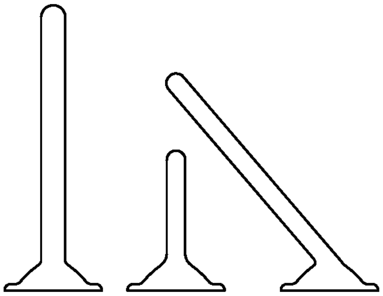
FIG. 7B shows a grid side view of an example of the triode formed with wirebonds.
Figure 7C:
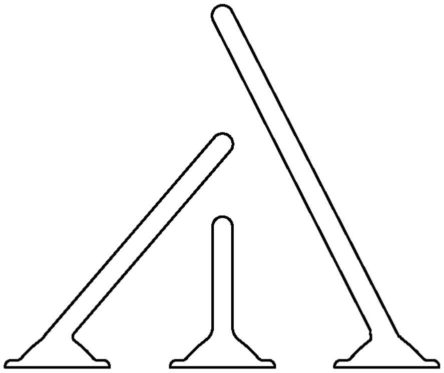
FIG. 7C shows a collector side view of an example of the triode formed with wirebonds.
Figure 7D:
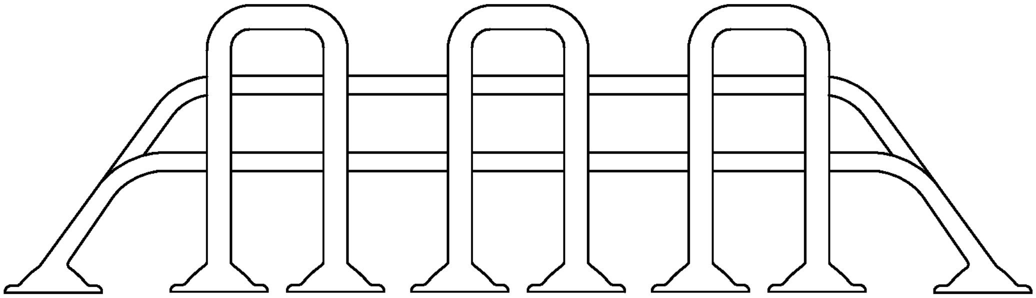
FIG. 7D shows a grid front view of an example of the triode formed with wirebonds.
Figure 7E:
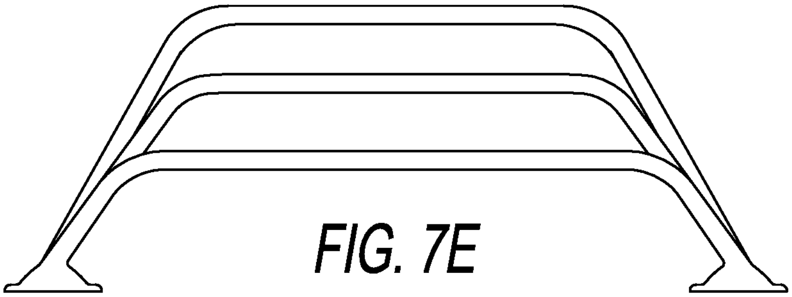
FIG. 7E shows a collector front view of an example of the triode formed with wirebonds.

The grid (820) and collector (830) of FIG. 7A provide simple examples of three dimensional wirebonded structures. FIGS. 7B and 7D are respectively a side and front view for the wirebond grid structure. FIGS. 7C and 7E are the side and front view for the wirebond collector structure respectively. More complicated structures are possible and can be used to control the emission, flow and collection of electrons.

Figure 8:
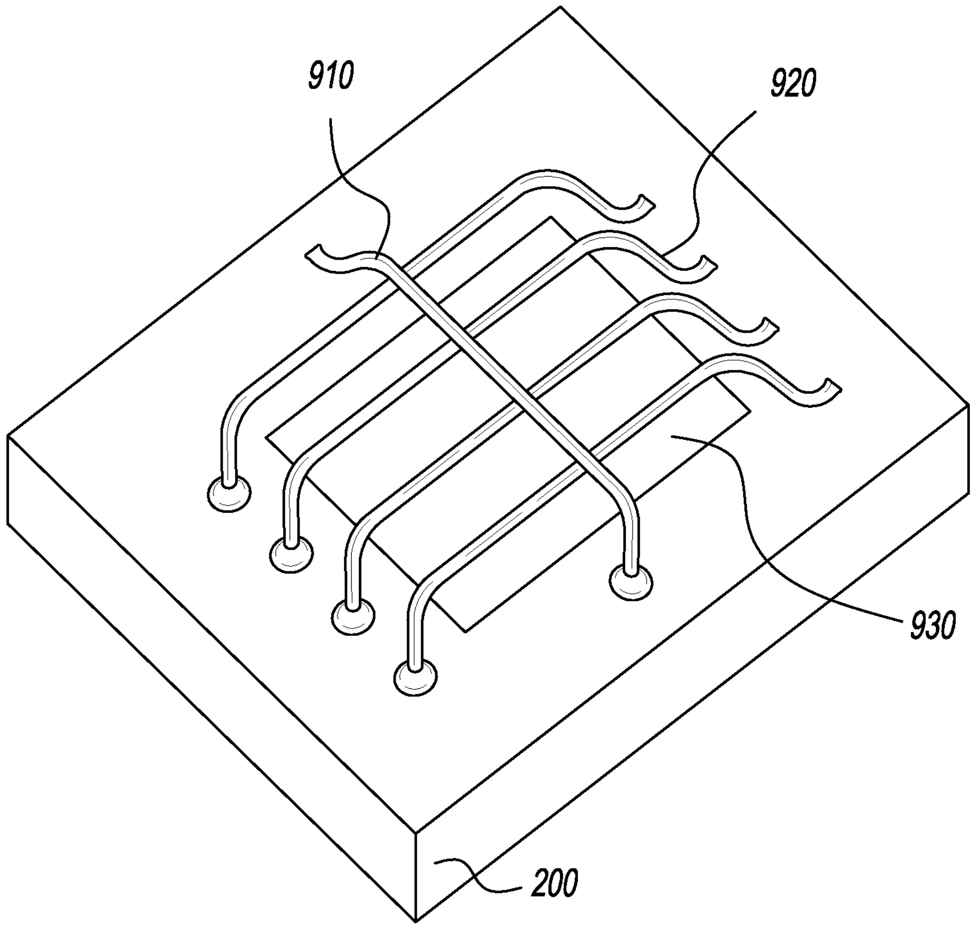
FIG. 8 shows an example triode formed with wirebonds and the electron flow oriented vertically to the substrate.

In FIG. 8, the embodiment has a vertically arranged emitter (910), grid (920) and collector (930). In this case, instead of a wirebonded structure for the electron collector, a substrate metallization area (930) is present. The collector metallization area could be coated with a fluorescing material, not shown.

Figure 13:
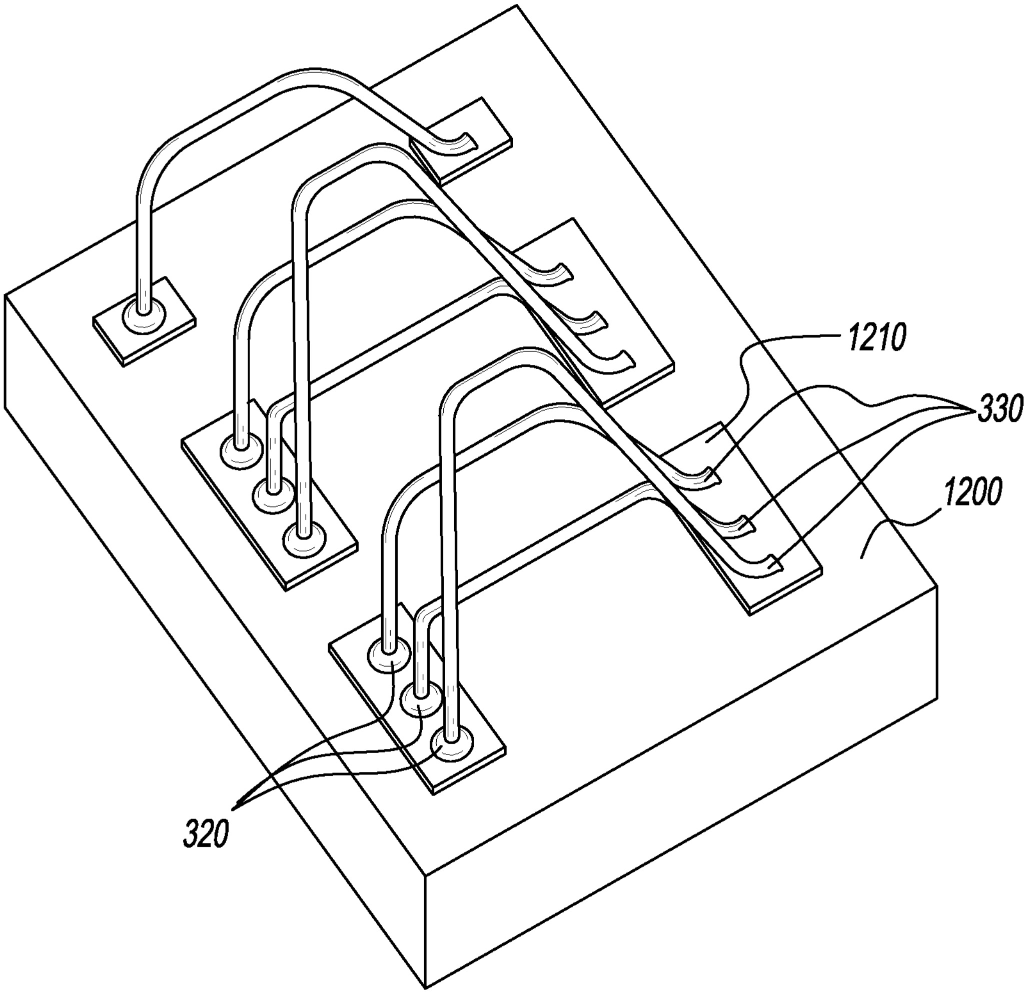
FIG. 13 shows a triode showing the wirebonded anode, grid and cathode by wirebonding the wire to a pad in or on a substrate.

Example spacings between the emitter, grid and collector for FIG. 7 and FIG. 8 can be found in for example 9,583,300 (see in particular the description of FIG. 13). For example, spacings between the emitter and grid are from 0.05 to 1.0 mm, preferably 0.1 to 0.8 mm, 0.2 to 0.6 mm or around 0.4 mm and those between the grid and collector are from 0.05 to 1.0 mm, preferably 0.1 to 0.8 mm, 0.2 to 0.6 mm or around 0.3 mm.

Figure 9A:
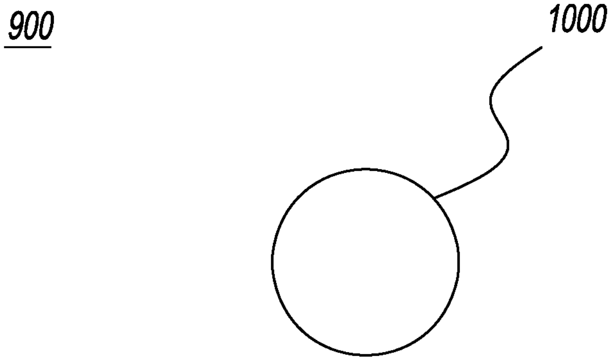
FIGS. 9A-C show cross-sections for the wires used in wirebond formation.
Figure 9B:
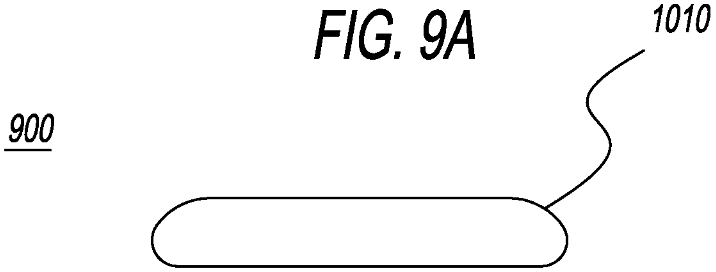
Figure 9C:
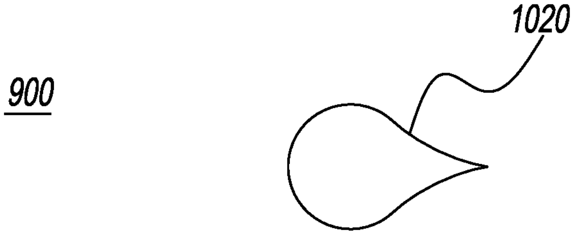

FIG. 9 provides cross-sections for the wire used in the wirebond. The wire or wire filament of a wirebond is typically circular or near circular in cross-section, FIG. 9A. To better gather electrons at the anode it is possible to use wire that is flattened, FIG. 9B. The flattened surface provides a more efficient electron collection surface if oriented to the electron flow. Preferred orientation would be the flattened surface facing to the electron flow. Changing the emitter wire from circular to a tear drop or pointed shape emits electrons preferentially at the thin edge, FIG. 9C. This can be used to reduce the current needed for heating. The tear drop or pointed shape also is beneficial for field emission since a lower field strength is needed for pulling electrons free from the point.

It is possible to have two or more triodes inside a single package. For space usage efficiency, the different triodes may use the same collector. Alternatively the different triodes may use the same emitter. Multiple triodes in a single package using the same collector and emitter are conceptually possible.

Preferably, a lid is used to properly enclose the triode. The lid provides a barrier separating the space inside the cavity from the outside atmosphere. The atmosphere outside the lid may contaminate the triode in two basic ways. First, the triode works best in a vacuum, e.g., the triode components disposed in the cavity are in a vacuum. The lid defines the closed volume of the cavity that is under vacuum. Second the lid provides a physical barrier through which damaging chemicals cannot pass. It is of particular concern to isolate the triode components from chemicals and/or damaging electromagnetic energy that may oxidize the emitter surfaces.

In addition to providing a physical barrier the lid can function to provide other benefits. The lid can be designed to have one or more electrical functions. For example, the lid may provide an electrical ground potential for stray electrons present in the triode cavity. By being at a ground or slightly positive potential, charge buildup on surfaces can be reduced.

In other aspects the lid can function as a carrier, mounting surface or substrate for one or more triode elements and also other electronic components. As an example, the lid may be the surface on which the grid is created and/or a surface on which the grid is mounted. The wirebonding method described herein can be used for fabricating a triode having, e.g., a grid mounted on or integrated with an interior surface of the lid. In this embodiment the lid, once placed and sealed (joined) to the substrate, has the grid in the proper place for the triode to function.

Figure 19A:
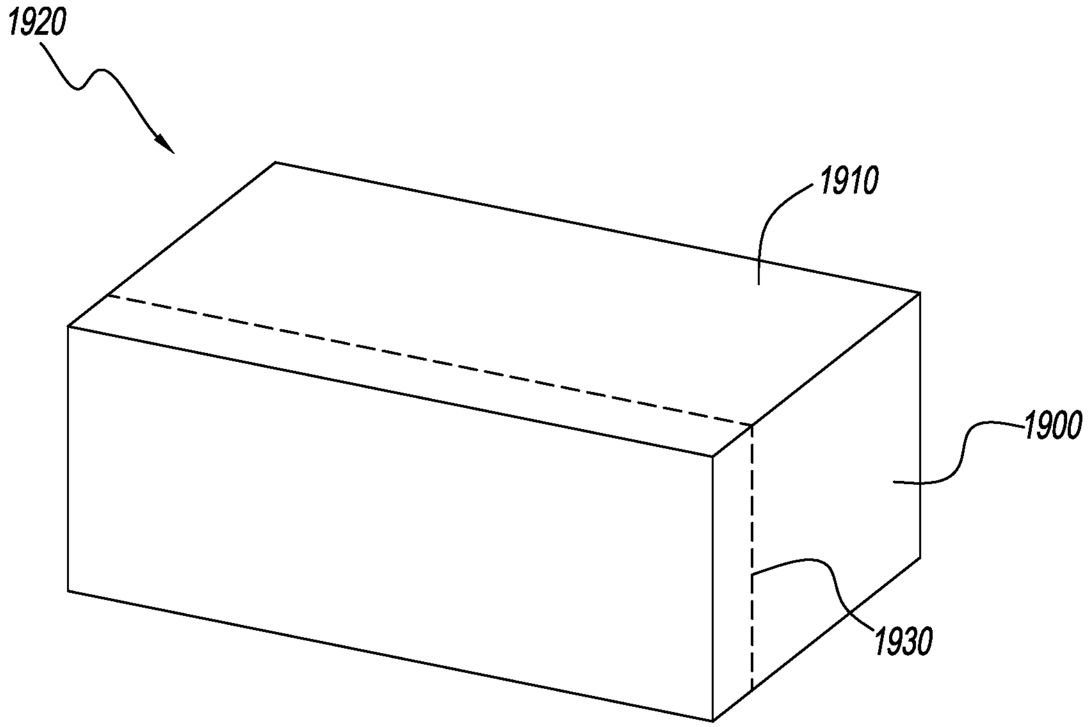
FIG. 19A shows a box shape inside which the wirebonded triode structure exists.

In FIG. 19A the closed triode assembly is shown (1920) which includes the substrate (1900) and lid (1910). The substrate for this figure is a cavity configuration while the lid is a flat plate, FIGS. 19B and 19C. For FIG. 19B and FIG. 19C the dashed line (1930) of FIG. 19A shows where the opened view look into the triode assembly volume occurs.

Figure 19B:
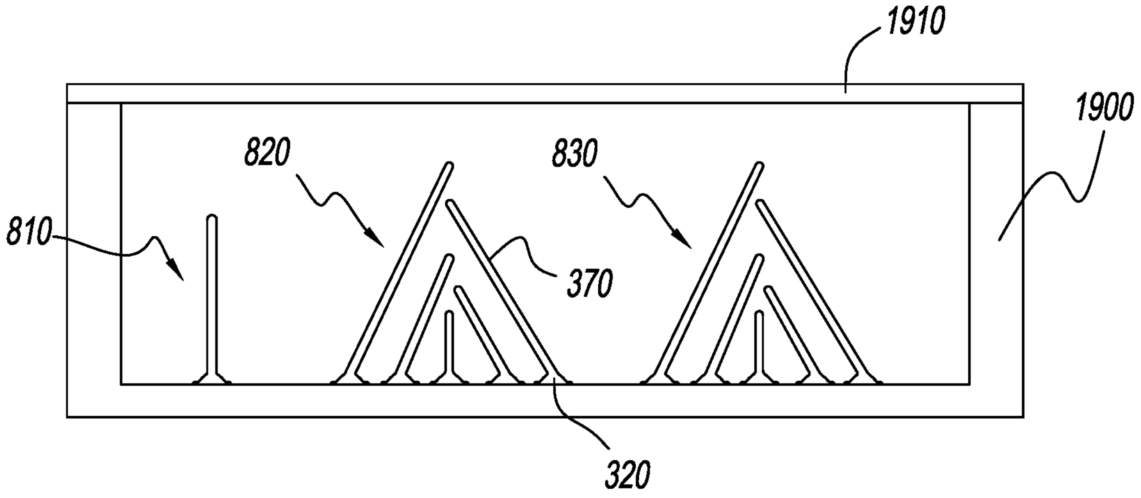
FIG. 19B shows a cut-away image showing the location of emitter, grid and collector.
Figure 19C:
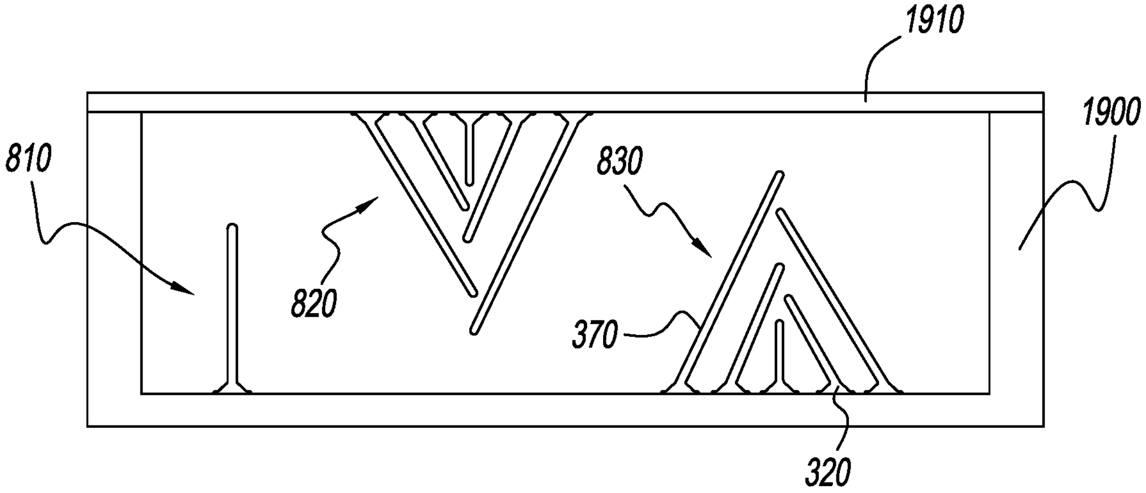
FIG. 19C shows a cut-away image showing the possibility for having, for example, the grid attached to a surface other than the surface for the emitter and collector.

FIG. 19B shows an opened view (sideview in the plane of the substrate on which the components are mounted) including the emitter (810), grid (820) and collector (830), all with electrical connections to the substrate (1900). FIG. 19C shows the grid (820) electrically connected to the lid (1910). The emitter (810) and collector (830) remain electrically connected to the substrate. Other combinations are possible such that one or more of the emitter, grid and collector are mounted on the lid, substrate and/or a surface of the lid that is not parallel to the substrate.

Other surfaces may be used for making electrical connections between components of the triode and/or between the triode and other components of a device that includes the triode. A simple substrate and lid configuration can include two or more distinct surfaces joined (e.g., in electrical communication) together to form a triode assembly.

During the sealing operation, an electrical connection can be made to provide an electrical path from the substrate and/or one or more components mounted on the substrate to the lid and/or one or more components mounted on the lid. One common method for sealing the lid to the substrate is with solder. The solder provides the electrical connectivity for providing an electrical communication to components of the triode mounted on or in contact with the lid, e.g., the grid.

The lid as described above is preferably of a shaped singular metallic construction and/or made from an electrically insulating material such as a metal oxide such as glass that is impermeable or resistant to passage of gases. For adding electrical properties to the triode, the metallic lid may be a sandwich or alloy of multiple materials. For instance the inside surface of the lid can be a conductor and/or may have conductive pathways comprising a metal coating or film whereas an outside surface can function as an insulator. An insulator on the outside provides protection to possible component users from electrical shocks.

Other configurations of conductor- and/or insulator-functionalized lids are further beneficial. For instance a metal-insulator metal sandwich provides electrical function on the lid inside surface, an insulator barrier to the outside surface and the outside metal surface provides, for example, protection from spurious outside electro-magnetic fields.

The inside metal surface of the lid can be patterned for multiple electrical purposes. In one aspect patterning can function to provide contact pads to which wirebonds are made. The pads have electrical connectivity and thus electrical routing can be patterned on or in the metal to thereby supply a voltage.

Other areas of the inside metallic surface of the lid can be patterned to create voltage fields to better direct electrons to the intended targets. For example, in conventional triodes the current flow from the emitter to the collector is not a perfect beam with some electrons diverging from the grid. A patterned lid (and likewise a similarly complementary patterned substrate) directs more electrons through the grid thereby increasing amplification for the triode.

EXAMPLES

The device of FIG. 7A is formed using the process described in FIGS. 10-15. FIGS. 10-15 illustrate one method for creating a triode using the wirebonding method of the present disclosure. The electron flow from the cathode through and by the grid and then to the anode is approximately parallel to the substrate surface.

Figure 10A:
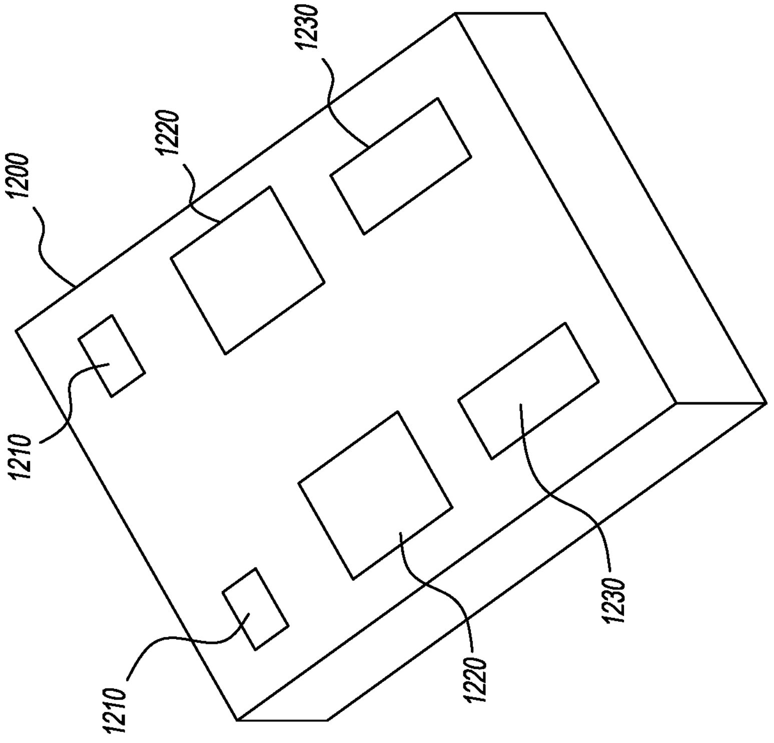
FIG. 10A shows a top view of an example of where the conductivity pads can be oriented on the substrate.
Figure 10B:
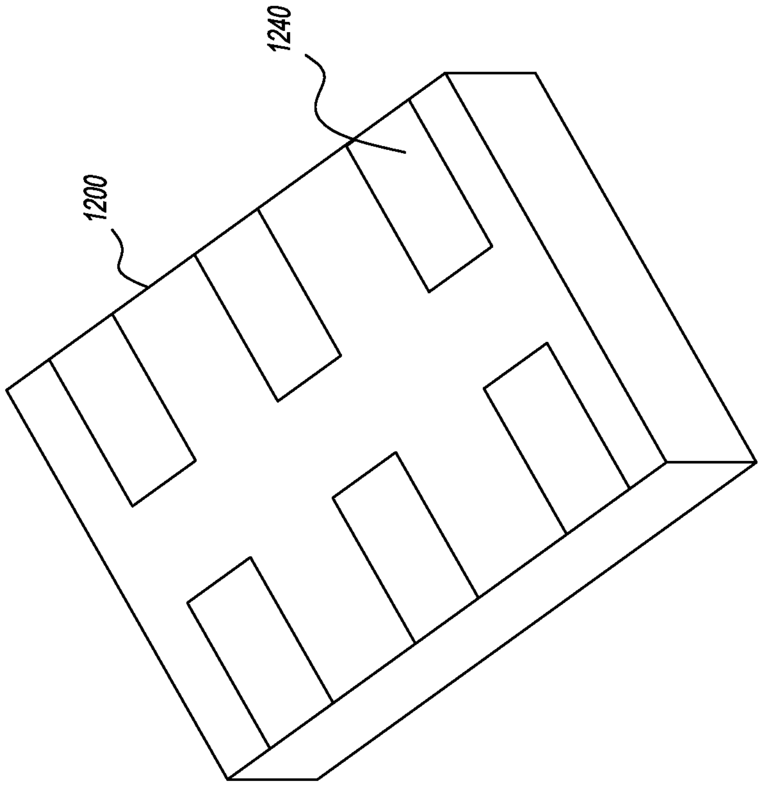
FIG. 10B shows a bottom view of an example of where the conductivity pads can be oriented on the substrate.

A ceramic substrate 1200 is provided in the first step as shown in FIGS. 10A and 10B. The substrate, 1200, provides a support for a wirebond process that forms a triode. The substrate has electrically conductive surfaces (e.g., pads), (1210, 1220, 1230, and 1240) for an illustration of appropriate size, number and patterning to function as electrical connectivity points and/or wirebond pads, on two or more surfaces. Pads are on at least one surface and preferably on both top and bottom surfaces. The top surface pads are used for the wirebond construction (1210, 1220, and 1230), FIG. 10A. The bottom surface pads (1240), FIG. 10B, are used for making electrical and mechanical connections to, for example, a printed circuit board.

The substrate has electrically conductive surfaces of size equal to or greater than the ball and wedge wirebond contact areas, number sufficient for the count of ball and wedge bonds and in a pattern to provide the layout for the device being fabricated.

Figure 11:
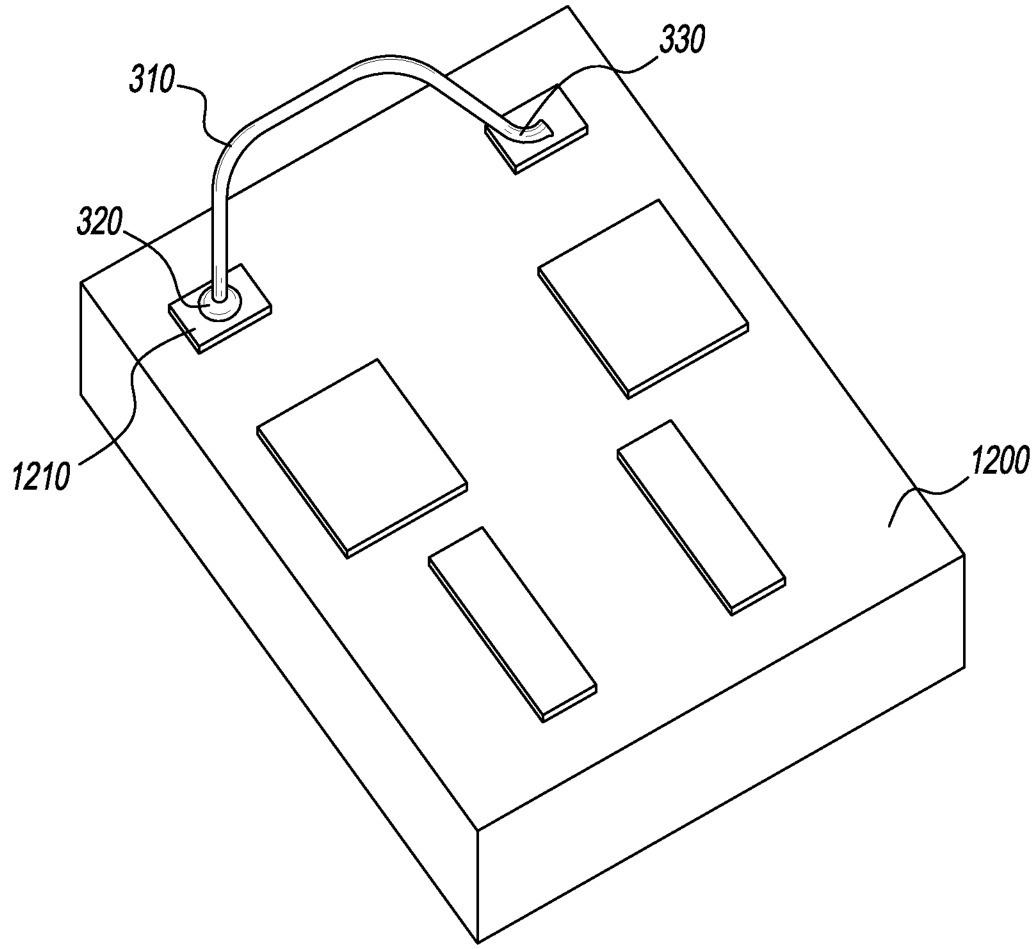
FIG. 11 shows an example substrate with a cathode (filament wire) wirebonded in place by wirebonding the wire to a pad in or on a substrate.

In the second step, the substrate, 1200, is brought to the sample holder in a wirebonding machine (e.g., K&S (Kulicke & Soffa Industries, Inc.) Rapid Pro Ball Bonder). The wirebonder thermosonically bonds each wirebond, preferably individually, to form wirebonded connections. After alignment of the wire to a substrate connectivity point, a single wire is bonded to the substrate top surfaces designated for the emitter circuit. Preferably each wire (310) uses two pads to make connectivity with the substrate (FIG. 11). The first connection will preferably be a ball bond (320) and the second connection will preferably be a wedge bond (330).

The emitter wire alloy and/or coating is different from the wire alloy used for the grid and collector, thus the substrate may optionally be moved to a different wirebonder for further bonding or the first wirebonding machine may exchange wire alloys.

Figure 12:
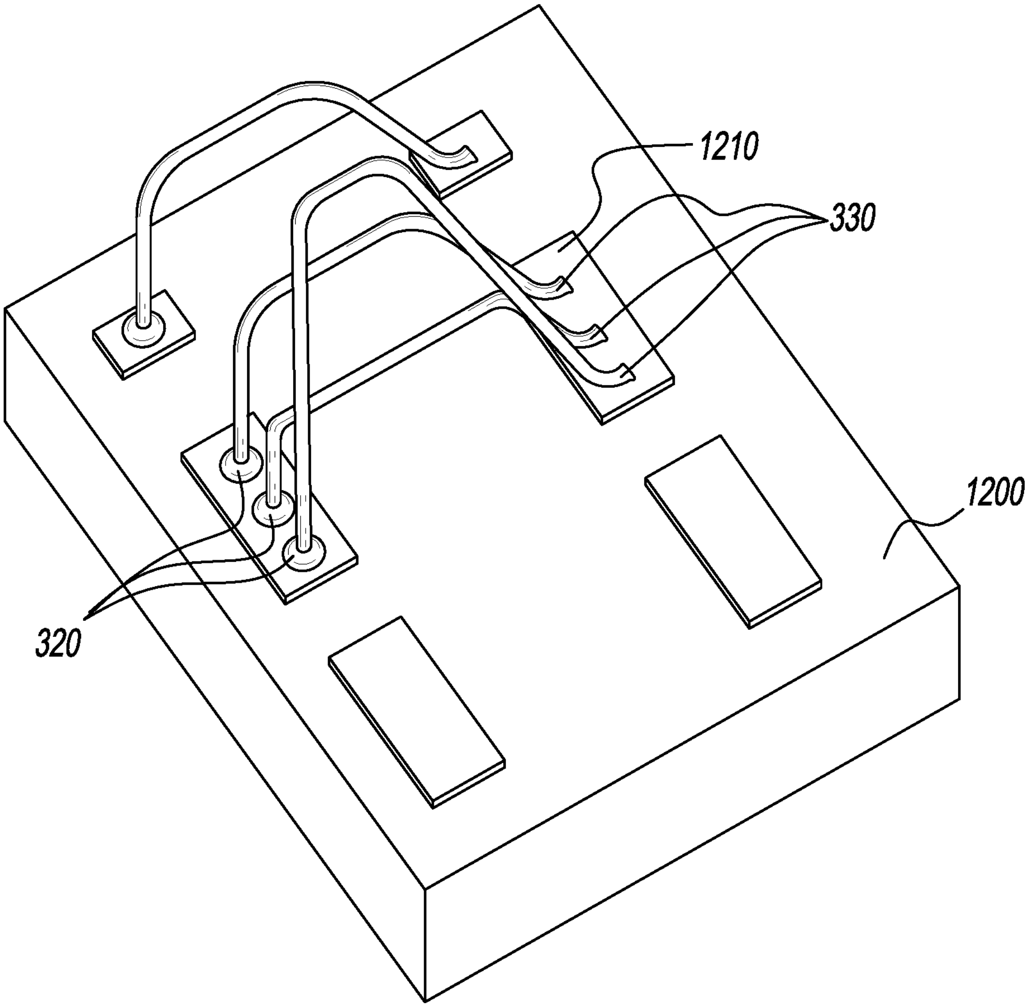
FIG. 12 shows an example with the wires for the cathode and grid wirebonded in place by wirebonding the wire to a pad in or on a substrate.

For the third step, the wirebonder or the substrate moves to allow the wirebonder to align and create the wirebonds for the grid (FIG. 12). Each wirebond is created according to a preprogrammed pattern using preferably ball bonds (320) and wedge bonds (330). After completion of the grid pattern the collector is created in a fourth step (FIG. 13).

Although the wire alloy for the grid and collector is preferably the same, the shape including diameter may be different. The difference in wires is achieved when the wirebonder exchanges the wire being used or the substrate moves to another wirebonder.

Figure 14:
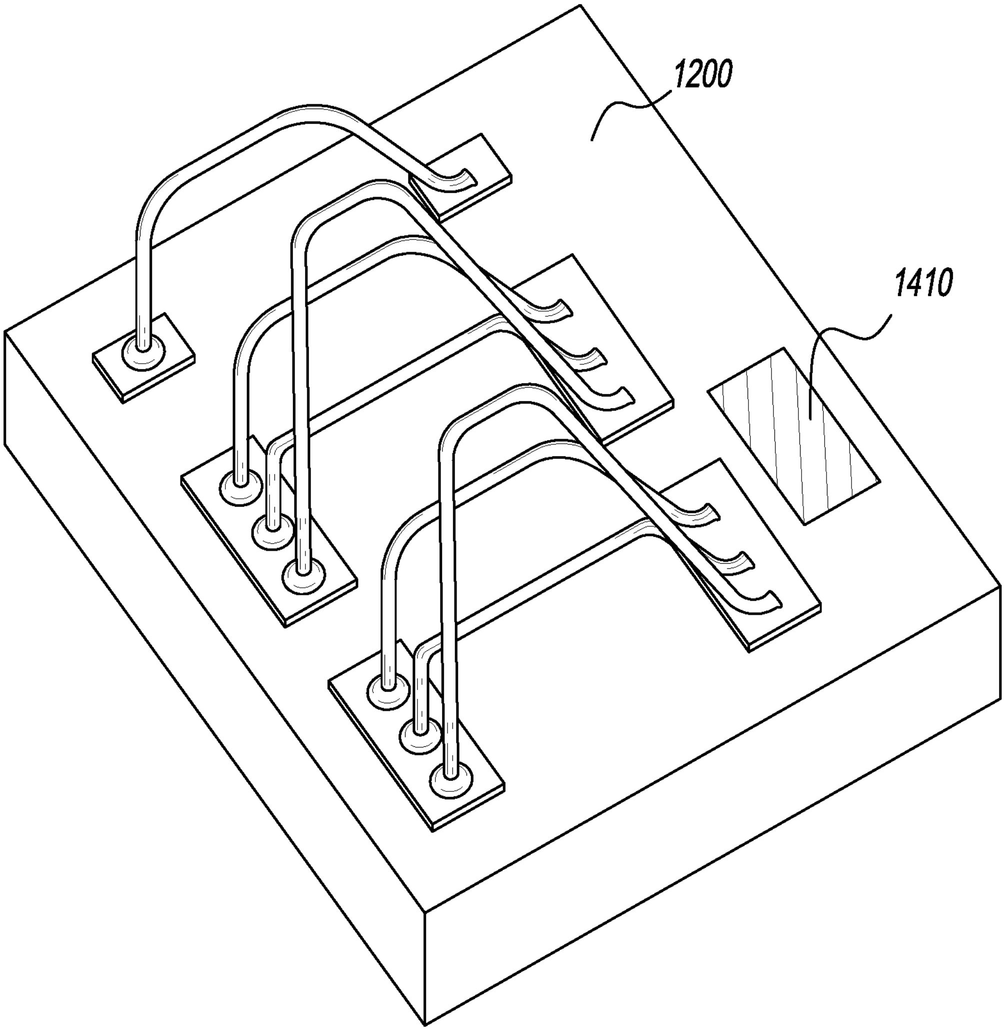
FIG. 14 shows an example triode with a getter material placed on the substrate.
Figure 14A:
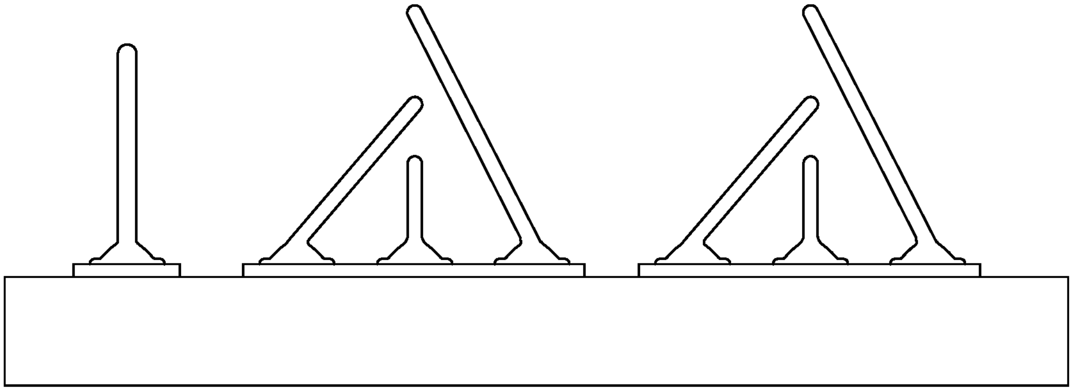
FIG. 14A shows a triode side view.
Figure 14B:
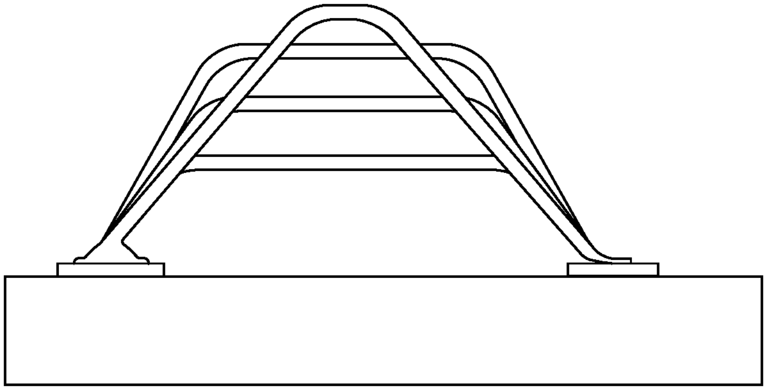
FIG. 14B shows a triode view looking at the collector.

Step five, generally optional, incorporates a getter material to prolong the vacuum life for the triode. The getter material (1410) is preferably placed on the substrate (1200) (FIG. 14) or is part of the cavity lid. FIGS. 14A and 14B represent the finished wirebonded structures in side and front view respectively.

A lid (1510) is then placed over the triode (FIG. 15) while in vacuum. This lid makes contact along the substrate (1200) perimeter. The lid and substrate form and define a box, e.g., vacuum cavity, in which the triode is disposed. A bond (1520) between the lid and the substrate can be created thermosonically, thermally, chemically (e.g., with an adhesive), mechanically or by other means. Since the lid is placed and sealed while under vacuum, the triode in the cavity is under vacuum.

Figure 15:
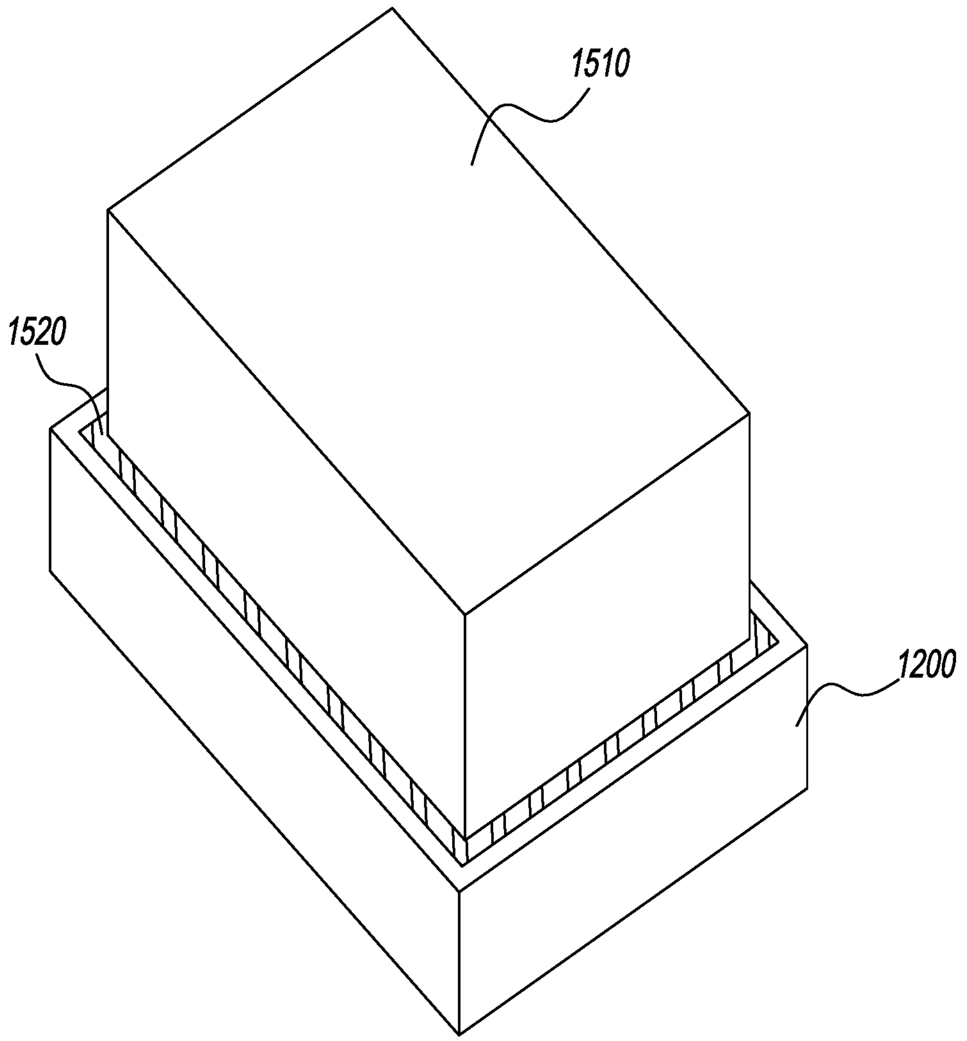
FIG. 15 shows an example triode enclosed with a lid to create the vacuum enclosure.

The lid of FIG. 15 is a represented by a five sided box. The lid of FIG. 19 is a single planar structure. The lid style is not immediately important and not limited to five sided nor single sided. Rather the lid function of sealing the cavity from the outside environment is important.

The preferred electron path is parallel to the substrate top surface. The electrons are emitted at the emitter, pass through and by the grid and are received at the collector.

The device of FIG. 8 is made using the steps described in FIGS. 16-18 and 15 illustrate a second method for creating a triode using the described wirebonding method. The electron flow is vertical to the substrate surface and as described the electron flow uses the substrate surface as a collector.

Figure 16B:
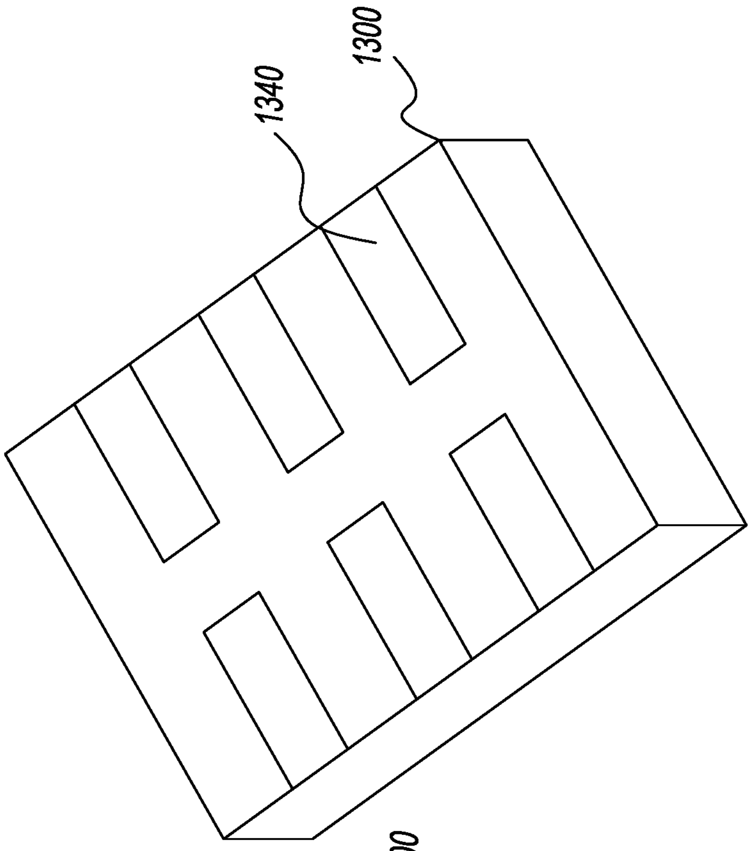
FIGS. 16A-B shows a top view (16A) and bottom view (16B) of a substrate example for a vertical triode arrangement.
Figure 16A:
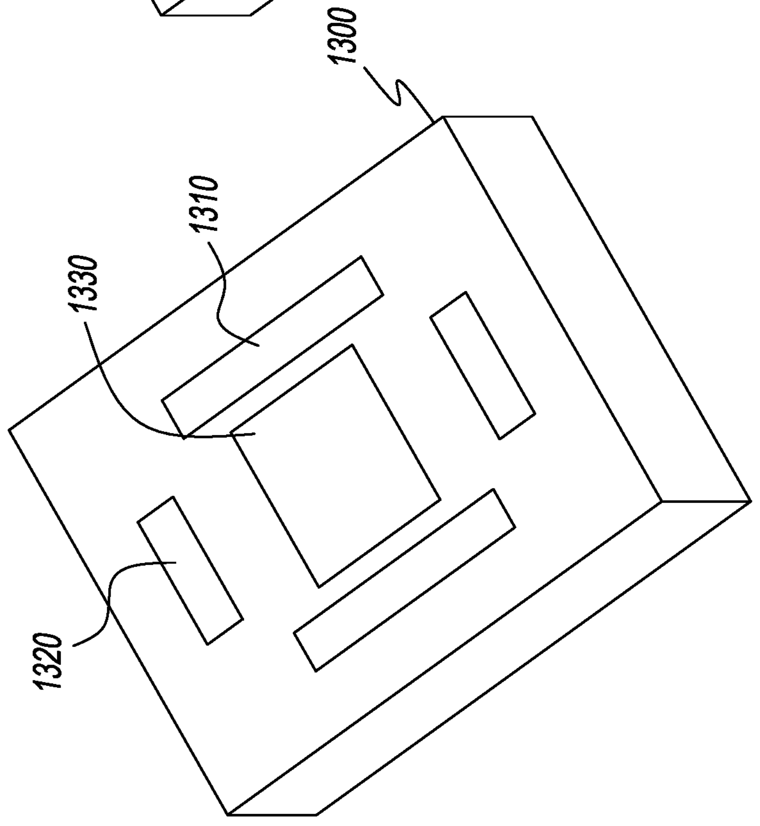

FIGS. 16A and 16B have a ceramic substrate 1300 in the form of a rectangular sheet. The substrate, 1300, provides a substrate for a device containing triode elements made using a wirebond process. The substrate has electrically conductive surfaces of appropriate size, number and patterning (1310, 1320, 1330, and 1340) to function as electrical connectivity points and/or wirebond pads, on two or more surfaces. Pads are on at least one surface and preferably on both top and bottom surfaces. The top surface pads, FIG. 16A, are used for the wirebond construction (1310, 1320). The bottom surface pads (1340), FIG. 16B, are used for making electrical and mechanical connections to, for example, a printed circuit board.

Pad 1330 is the collector for the triode and is preferably integral and preferably flush with the surface of the substrate, 1300. This pad may be coated with a fluorescing material, not shown.

Figure 17:
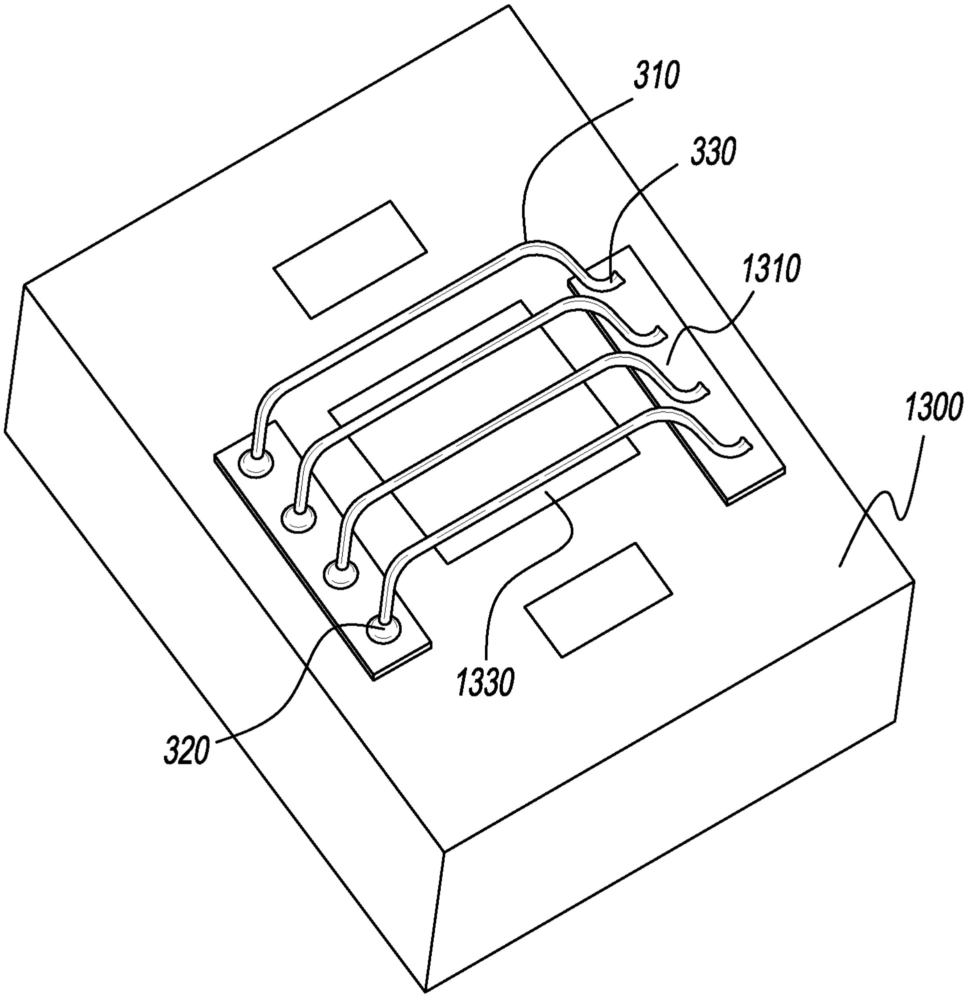
FIG. 17 shows grid wirebonds above the substrate collector pad.

The substrate is moved to a sample holder in a wirebonding machine. After alignment of the wire to the substrate one or preferably more wirebonds with wirebonded connections are made to form the grid (FIG. 17). Each wirebond preferably has a ball bond (320) and a wedge bond (330) that join the wire (310) to an electrically conductive substrate surface or pad thereon.

After forming the grid, the substrate can remain in the wirebonding machine or be transferred to a separate wirebonding machine to form the emitter. The substrate and wire are aligned and preferably one wirebond formed from one ball bond (320) and one wedge bond (330) are made to the proper electrically conductive substrate surfaces (FIG. 18).

Figure 18:
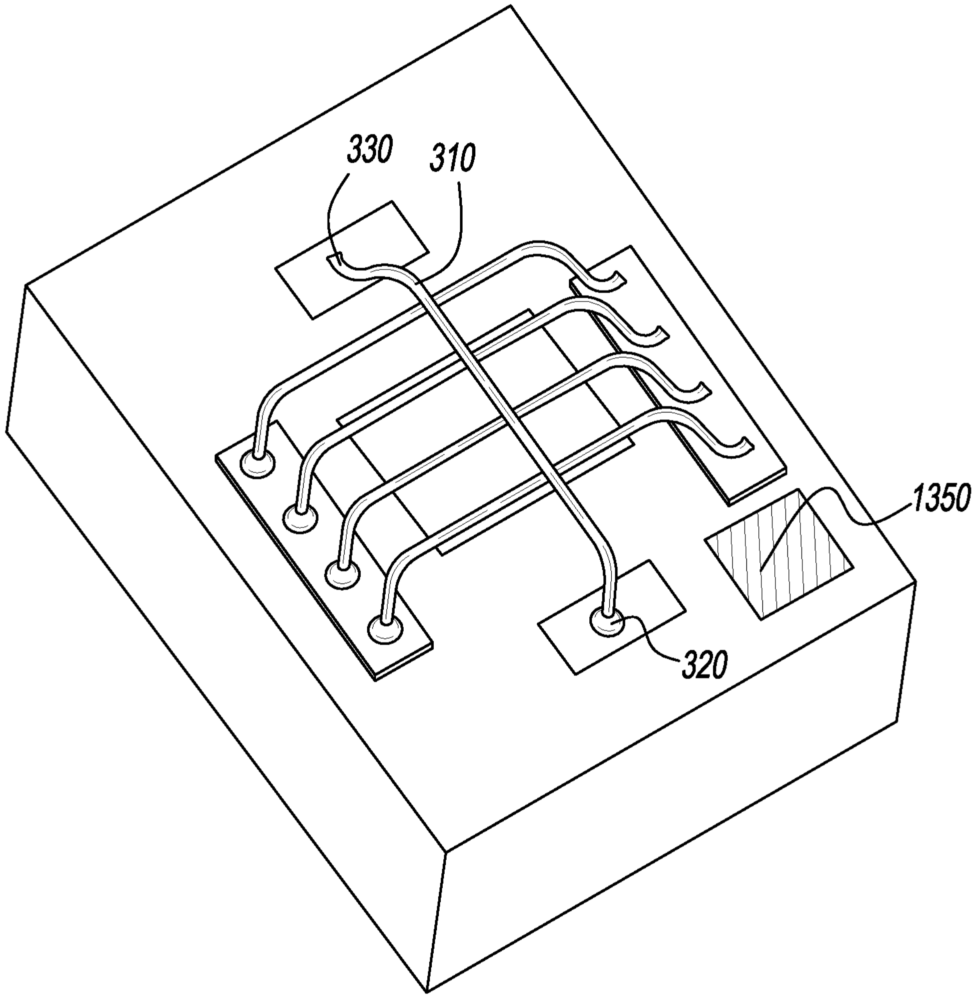
FIG. 18 shows a vertical triode arrangement with the cathode (filament), grid and getter shown.

After forming the grid and emitter the substrate optionally has getter material added (FIG. 18). The getter material is preferably attached to the substrate in areas away from the wirebonds (1350).

A lid (1510) is then joined to the substrate while in a vacuum (FIG. 15). The lid in the example is of a box shape with 5 main outside surfaces: 4 sides and 1 top. The lid is sealed (1520) to the substrate (1200) to ensure a vacuum is maintained inside the now sealed assembly.

The preferred electron path has the electrons emitted by the emitter above the grid, flowing through and by the grid and then reaching the collector. The electron path is nominally vertical to and aimed at the substrate surface in particular the substrate surface collector region.

Typically wirebonds are encapsulated with a thermoset or thermoplastic organic material like a curable epoxy or a molding compound. For the present disclosure it is preferred that complete encapsulation (i.e., complete submersion or contact at all surfaces with the organic material) is avoided. Complete encapsulation with a material may defeat the individual triode elements function for example by interfering with electron flow between the triode components. Nonetheless, those skilled in the art will realize that portions of the wirebond may be encapsulated with a material and allow the triode to function.

Obviously, numerous modifications and variations of the present invention are possible in light of the above teachings. It is therefore to be understood that within the scope of the appended claims, the invention may be practiced otherwise than as specifically described herein.

The invention claimed is:

1. A triode, comprising a package defining a cavity, a grid, an emitter and a collector disposed inside the cavity, wherein at least one of the grid, the emitter and the collector is a wirebonded structure inside the cavity or at least partially exposed to the cavity, wherein the grid is disposed between the emitter and the collector and at least two of the grid, the emitter and the collector have a wirebonded structure.

2. The triode of claim 1, wherein the package comprises a cover portion and a base portion, wherein each of the grid, the emitter and the collector are connected to the base portion, wherein the base portion has an interior surface defining a boundary of the cavity and an outside surface opposite the inside surface and that is outside the cavity.

3. The triode of claim 2, wherein the collector is a wirebonded structure having a plurality of wirebonded connections defining a plane that is disposed inside the cavity and elevated from the base portion.

4. The triode of claim 1, wherein the wirebonded structure is at least partially formed on a base portion of the triode such that a plane defined by a plurality of wirebonded connections is parallel and in direct contact with an interior surface of the base portion.

5. The triode of claim 1, wherein at least one of the grid, the emitter and the collector is a wirebonded structure inside the cavity.

6. The triode of claim 5, wherein at least one of the first pad and the second pad is disposed on an interior surface of a base portion of the triode and one or more of the wires projects from the base portion to bridge the first pad and the second pad without direct contact to the base portion.

7. The triode of claim 1, wherein at least one of the grid, the emitter and the collector is a wirebonded structure at least partially exposed to the cavity.

8. The triode of claim 1, wherein at least one of the grid, the emitter and the collector is a wirebonded structure inside the cavity.

9. A triode, comprising a package defining a cavity, a grid, an emitter and a collector disposed inside the cavity, wherein at least one of the grid, the emitter and the collector is a wirebonded structure inside the cavity or at least partially exposed to the cavity, wherein each of the grid, the emitter and the collector is in direct contact with a base portion of the triode and each are connected to an electrical lead passing through the base portion to a pin or connector on an exterior surface of the base portion.

10. The triode of claim 9, wherein at least one of the grid, the emitter and the collector is a wirebonded structure at least partially exposed to the cavity.

11. The triode of claim 9, wherein at least one of the grid, the emitter and the collector is a wirebonded structure inside the cavity.

12. A triode, comprising a package defining a cavity, a grid, an emitter and a collector disposed inside the cavity, wherein at least one of the grid, the emitter and the collector is a wirebonded structure inside the cavity or at least partially exposed to the cavity, wherein at least one of the grid and the collector includes a wirebonded structure with a tensioned wire.

13. The triode of claim 12, wherein at least one of the grid, the emitter and the collector is a wirebonded structure at least partially exposed to the cavity.

14. The triode of claim 12, wherein at least one of the grid, the emitter and the collector is a wirebonded structure inside the cavity.

* * * * *